US012637340B2

(12) United States Patent
King et al.

(10) Patent No.: US 12,637,340 B2
(45) Date of Patent: May 26, 2026

(54) SYSTEMS AND METHODS FOR MATERIAL HANDLING VEHICLE

(71) Applicant: The Raymond Corporation, Greene, NY (US)

(72) Inventors: David A. King, Rock Island, IL (US); Adam Pehowski, Bettendorf, IA (US); Nathan C. Mortenson, Muscatine, IA (US); Aaron R. Pasker, Cedar Rapids, IA (US)

(73) Assignee: The Raymond Corporation, Greene, NY (US)

( * ) Notice: Subject to any disclaimer, the term of this patent is extended or adjusted under 35 U.S.C. 154(b) by 430 days.

(21) Appl. No.: 18/210,325

(22) Filed: Jun. 15, 2023

(65) Prior Publication Data

US 2023/0406683 A1 Dec. 21, 2023

Related U.S. Application Data

(60) Provisional application No. 63/353,451, filed on Jun. 17, 2022.

(51) Int. Cl.
*B66F 9/12* (2006.01)
*B66F 9/075* (2006.01)

(52) U.S. Cl.
CPC .............. *B66F 9/12* (2013.01); *B66F 9/0759* (2013.01)

(58) Field of Classification Search
None
See application file for complete search history.

(56) References Cited

U.S. PATENT DOCUMENTS

| | | | |
|---|---|---|---|
| 2,604,210 | A | 7/1952 | Boone |
| 2,950,126 | A | 8/1960 | Armentrout |
| 3,807,750 | A | 4/1974 | Brown |
| 4,032,165 | A | 6/1977 | Russell |
| 4,056,066 | A | 11/1977 | Homanick |
| 4,902,188 | A | 2/1990 | Page |
| 4,991,725 | A | 2/1991 | Welsch et al. |
| 5,082,074 | A | 1/1992 | Fischer |
| 5,332,306 | A | 7/1994 | Babb et al. |

(Continued)

FOREIGN PATENT DOCUMENTS

JP H0912292 A 1/1997

OTHER PUBLICATIONS

European Patent Office, Extended European Search Report, Application No. 23179653.3, Nov. 13, 2023, 7 pages.

(Continued)

*Primary Examiner* — Jonathan Snelting
(74) *Attorney, Agent, or Firm* — Quarles & Brady LLP

(57) ABSTRACT

A material handling vehicle that comprises a power section supported by a vehicle frame, a platform, and an operator compartment between the power section and the platform. The material handling vehicle also comprises a post assembly attached to the platform and a clamping assembly secured with the post assembly. The post assembly comprises one or more vertical posts and one or more horizontal posts. The clamping assembly comprises two space apart actuators connected with a clamping bar. The clamping bar comprises a plurality of clamps. The clamping bar is configured to move relative to the post assembly between a first state and a second state.

12 Claims, 15 Drawing Sheets

(56) References Cited

U.S. PATENT DOCUMENTS

| | | | | |
|---|---|---|---|---|
| 5,340,268 | A * | 8/1994 | Dowty | B66F 9/18 414/622 |
| 5,573,078 | A | 11/1996 | Stringer et al. | |
| 5,860,485 | A | 1/1999 | Ebbenga | |
| 6,149,370 | A | 11/2000 | DiBartolomeo | |
| 6,168,367 | B1 | 1/2001 | Robinson | |
| 6,260,863 | B1 | 7/2001 | Orozco et al. | |
| 6,299,184 | B1 | 10/2001 | Krawczyk | |
| 6,435,803 | B1 | 8/2002 | Robinson | |
| 6,742,792 | B1 | 6/2004 | Hooper et al. | |
| 6,793,223 | B2 | 9/2004 | Ondrasik et al. | |
| 6,832,884 | B2 | 12/2004 | Robinson | |
| 7,025,548 | B2 | 4/2006 | Krawczyk et al. | |
| 7,143,912 | B2 | 12/2006 | Caneba | |
| 7,213,684 | B2 * | 5/2007 | Bruns | B66F 9/18 414/466 |
| 7,219,904 | B1 | 5/2007 | Boom et al. | |
| 7,549,651 | B2 | 6/2009 | Holtan et al. | |
| 7,854,444 | B2 | 12/2010 | Zhuang | |
| 8,272,824 | B1 * | 9/2012 | Putney | A01G 23/02 901/14 |
| 8,342,554 | B2 | 1/2013 | Felsl et al. | |
| 8,591,154 | B2 | 11/2013 | Bartels | |
| 8,894,037 | B1 | 11/2014 | Brauer et al. | |
| 8,894,086 | B2 | 11/2014 | Ekbote | |
| 9,751,658 | B1 | 9/2017 | Brauer et al. | |
| 9,764,675 | B1 * | 9/2017 | Theobald | B66F 9/181 |
| 9,790,068 | B1 | 10/2017 | Brauer et al. | |
| 9,932,214 | B1 | 4/2018 | Brauer et al. | |
| 10,053,125 | B2 | 8/2018 | Reges et al. | |
| 2002/0043544 | A1 | 4/2002 | Caneba | |
| 2003/0017021 | A1 | 1/2003 | Krawczyk | |
| 2003/0231945 | A1 | 12/2003 | Weatherly | |
| 2004/0056439 | A1 | 3/2004 | Arceta et al. | |
| 2004/0071520 | A1 | 4/2004 | Krawczyk et al. | |
| 2004/0188963 | A1 | 9/2004 | Gant | |
| 2004/0256166 | A1 | 12/2004 | Holtan et al. | |
| 2008/0217503 | A1 | 9/2008 | Zhuang | |
| 2012/0104731 | A1 | 5/2012 | Goldszer | |
| 2012/0325593 | A1 | 12/2012 | Reep | |
| 2013/0189046 | A1 | 7/2013 | Bartels | |
| 2017/0313335 | A1 | 11/2017 | Reges et al. | |

OTHER PUBLICATIONS

European Patent Office, Extended Search Report, Application No. 25211516.7, Feb. 19, 2026, 7 pages.

* cited by examiner

SYSTEMS AND METHODS FOR MATERIAL HANDLING VEHICLE

CROSS-REFERENCE TO RELATED APPLICATIONS

This application is based on and claims priority to U.S. Provisional Patent Application No. 63/353,451, filed Jun. 17, 2022, and entitled "SYSTEMS AND METHODS FOR MATERIAL HANDLING VEHICLE," which is incorporated herein by reference in its entirety.

STATEMENT REGARDING FEDERALLY SPONSORED RESEARCH

Not Applicable.

BACKGROUND

Warehouses typically employ the use of material handling vehicles, and more specifically, operators may perform various unloading and loading tasks with a material handling vehicle within the warehouse.

BRIEF SUMMARY

The present disclosure relates generally to material handling vehicles and, more specifically, to a material handling vehicle having a clamping bar that automatically rises and lowers with little or no input by an operator.

In one aspect, the present disclosure provides a material handling vehicle. The material handling vehicle comprises a power section supported by a vehicle frame, a platform, and an operator compartment between the power section and the platform. The material handling vehicle also comprises a post assembly attached to the platform and a clamping assembly secured with the post assembly. The post assembly comprises one or more vertical posts and one or more horizontal posts. The clamping assembly comprises two spaced apart actuators connected with a clamping bar. The clamping bar comprises a plurality of clamps and is configured to move relative to the post assembly between a first state and a second state.

In some non-limiting examples, the platform comprises a platform length PL and the clamping bar comprises a clamping bar length CL, and the clamping bar length CL is less than 90 percent of the platform length PL. In some non-limiting examples, the post assembly comprises an angled post that is non-parallel with the one or more vertical posts and the one or more horizontal posts. In some non-limiting examples, the material handling vehicle further comprises a control unit, and the control unit is in communication with the clamping assembly to control operation of the two spaced apart actuators. In some non-limiting examples, the plurality of clamps includes a main clamp and at least one auxiliary clamp, and the main clamp comprises at least two main clamp wings. In some non-limiting examples, the platform is configured to hold a plurality of carts. In some non-limiting examples, each of the main clamp wings is configured to secure two carts of the plurality of carts on the platform in the first state. In some non-limiting examples, the clamping bar is configured to move relative to the post assembly to a third state.

According to another aspect of the present disclosure, a method for loading a material handling vehicle is provided. The method comprises providing the material handling vehicle. The material handling vehicle comprises a platform and a post assembly attached with a clamping assembly. The clamping assembly comprises a clamping bar and two spaced apart actuators. The clamping bar is configured to move relative to the post assembly between a first state and a second state. The method also comprises loading a plurality of carts on the platform of the material handling vehicle and determining an end of the loading step. The method further comprises moving the clamping bar from the second state to the first state after the end of the loading step has been determined. The method also comprises moving the platform from a down position to an up position after the clamping bar has moved from the second state to the first state.

In some non-limiting examples, the material handling vehicle further comprises an operator compartment, and the operator compartment defines a floor that has a mat. In some non-limiting examples, the end of the loading step is determined when an operator steps on the mat. In some non-limiting examples, four carts are loaded onto the platform of the material handling vehicle. In some non-limiting examples, the clamping bar is configured to move from the second state to the first state by the two spaced apart actuators. In some non-limiting examples, the method further comprises moving the material handling vehicle and filling the plurality of carts. In some non-limiting examples, the clamping bar is configured to move independently from the platform.

According to another aspect of the present disclosure, a method for loading and unloading a material handling vehicle is provided. The method comprises providing the material handling vehicle, which comprises a control unit, a platform, and a post assembly attached with a clamping assembly. The clamping assembly comprises a clamping bar that is configured to move relative to the post assembly between a first state and a second state. The method also comprises loading a plurality of carts on the platform of the material handling vehicle. The method further comprises determining an end of the loading step and moving the clamping bar from the second state to the first state after the end of the loading step has been determined and moving the platform from a down position to an up position after the clamping bar has moved from the second state to the first state. The method further comprises moving the material handling vehicle and engaging an unloading step. The method also comprises simultaneously moving the platform from the up position to the down position and moving the clamping bar from the first state to the second state after the unloading step has been engaged. The method further comprises unloading the plurality of carts from the platform of the material handling vehicle.

In some non-limiting examples, the platform comprises a platform length PL and the clamping bar comprises a clamping bar length CL. The clamping bar length CL is less than 90 percent of the platform length PL. In some non-limiting examples, two actuator assemblies on opposite sides of the clamping assembly move the clamping bar from the second state to the first state and from the first state to the second state. In some non-limiting examples, the material handling vehicle further comprises an operator compartment. The operator compartment defines a floor that has a mat. The end of the loading step is determined when an operator steps on the mat. In some non-limiting examples, a single button engages the unloading step.

The foregoing and other aspects and advantages of the disclosure will appear from the following description. In the description, reference is made to the accompanying drawings which form a part hereof, and in which there is shown by way of illustration a preferred configuration of the disclosure. Such a configuration does not necessarily represent the full scope of the disclosure, however, and reference is made to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
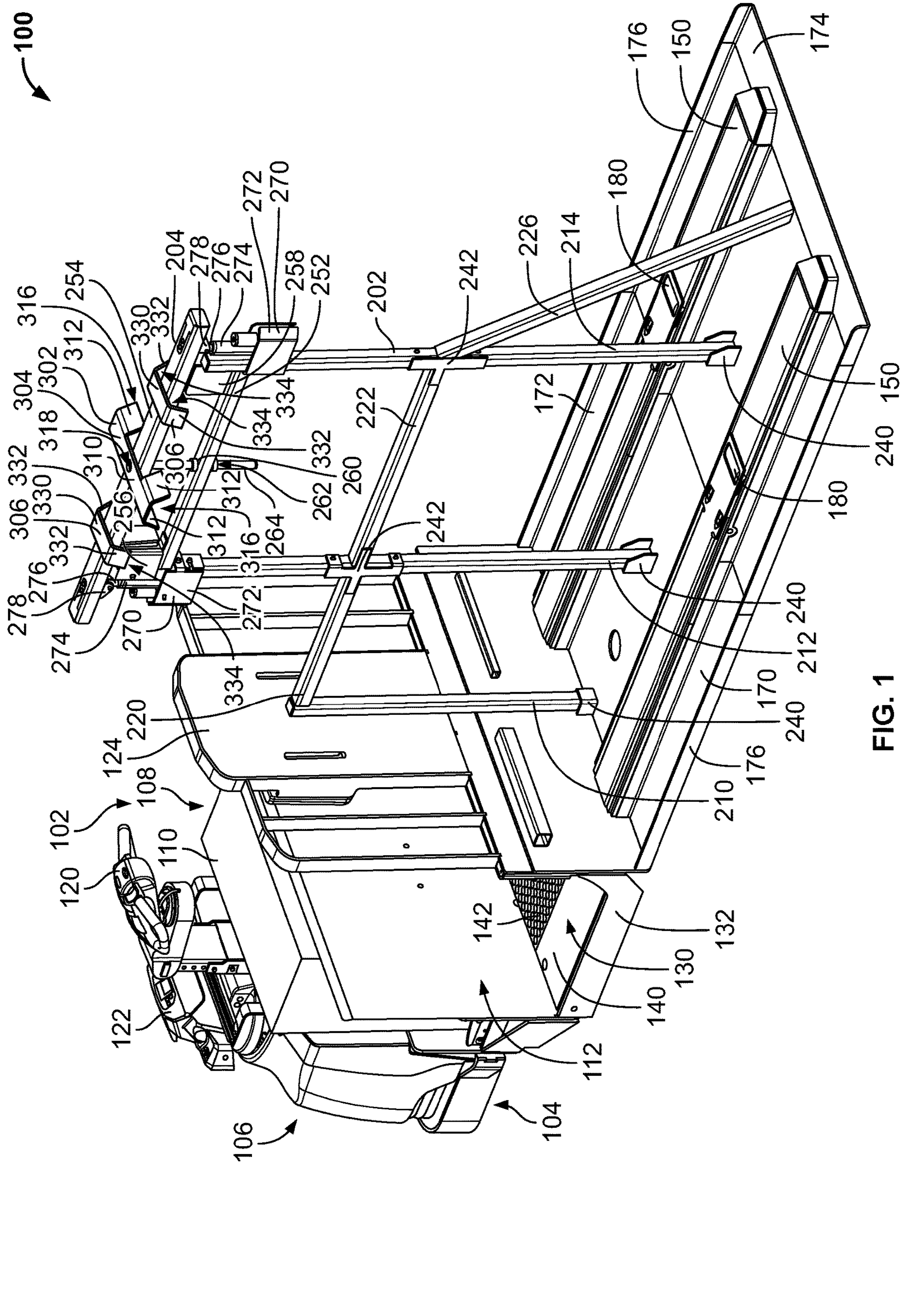
FIG. 1 is a top, rear, and right isometric view of a non-limiting example of a material handling vehicle including an operator compartment according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Throughout the disclosure, the terms "about" and "approximately" refer to a range of values ±5 percent of the numeric value that the term precedes. As noted herein, all ranges disclosed within this application are inclusive of the outer bounds of the range.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is to be appreciated that material handling vehicles are designed in a variety of configurations to perform a variety of tasks. The various configurations of material handling vehicles described herein are shown by way of example. It will be apparent to those of skill in the art that the present invention is not limited to vehicles of these types and can also be provided in various other types of material handling vehicle configurations, including for example, order pickers, reach vehicles, counterbalanced vehicles, and any other material handling vehicles. The various aspects disclosed herein are suitable for all of driver controlled, pedestrian controlled, remotely controlled, and autonomously controlled material handling vehicles.

Figure 2:
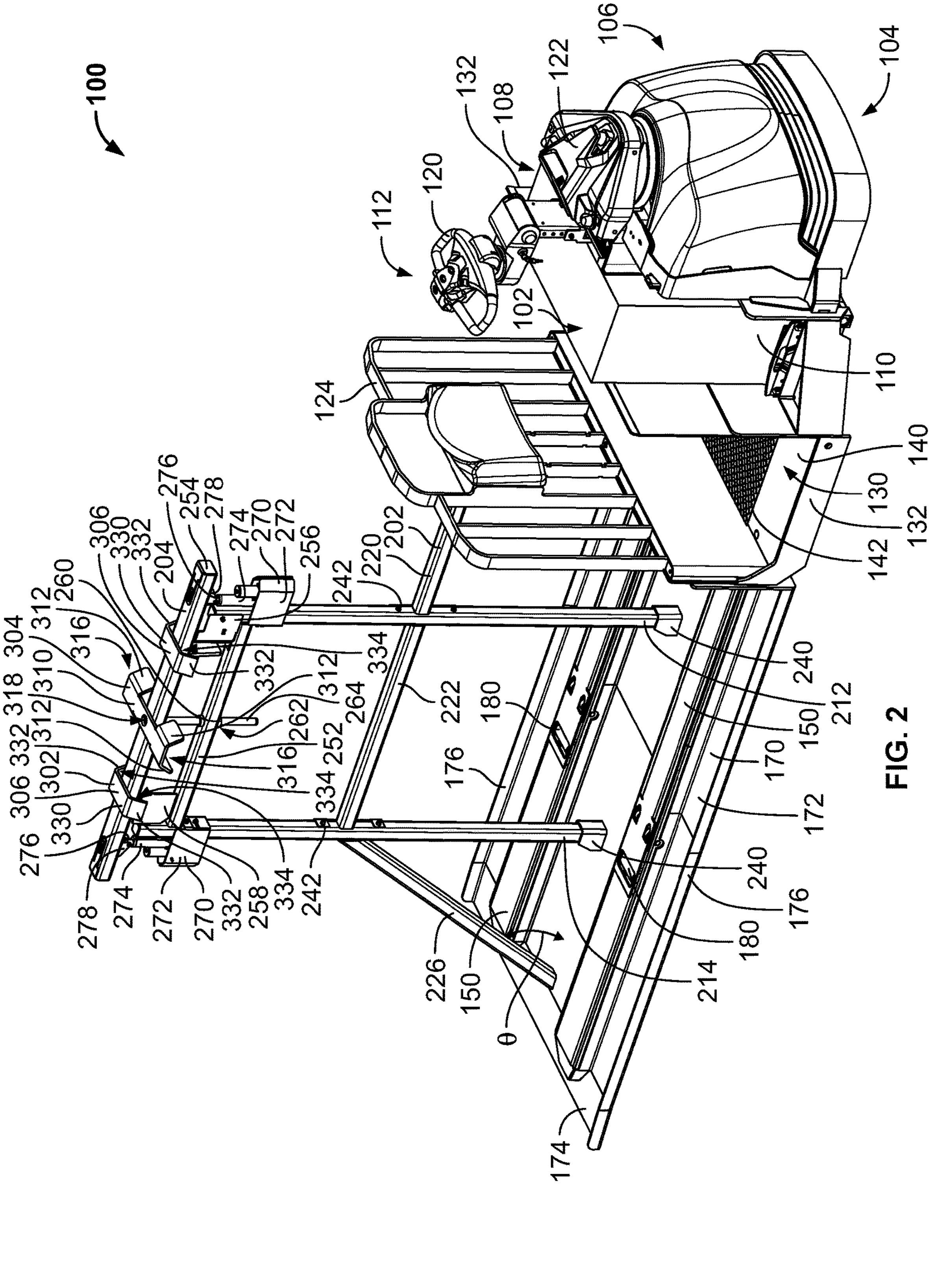
FIG. 2 is a top, front, and left isometric view of the material handling vehicle of FIG. 1.
Figure 3:
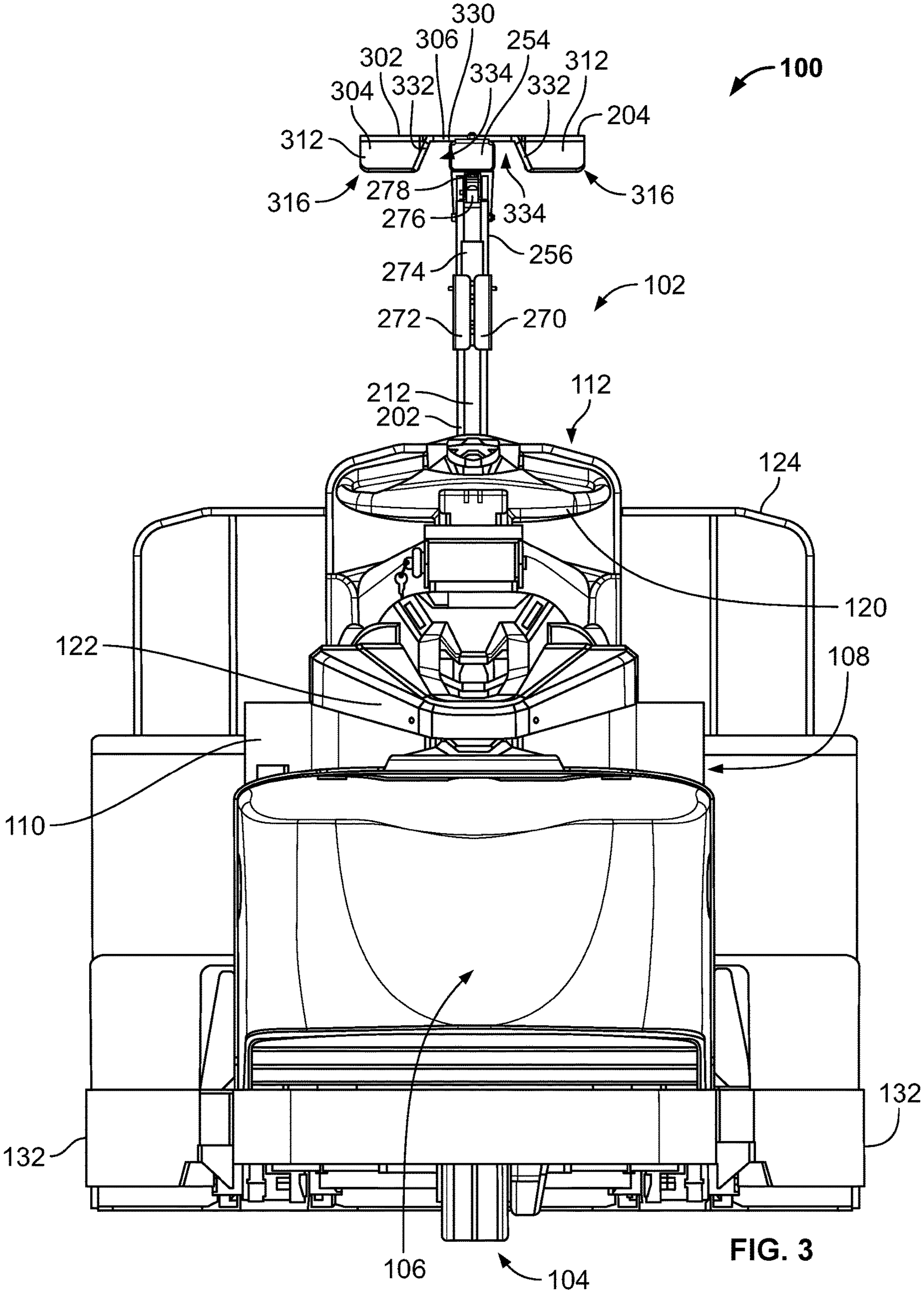
FIG. 3 is a front elevational view of the material handling vehicle of FIG. 1.
Figure 4:
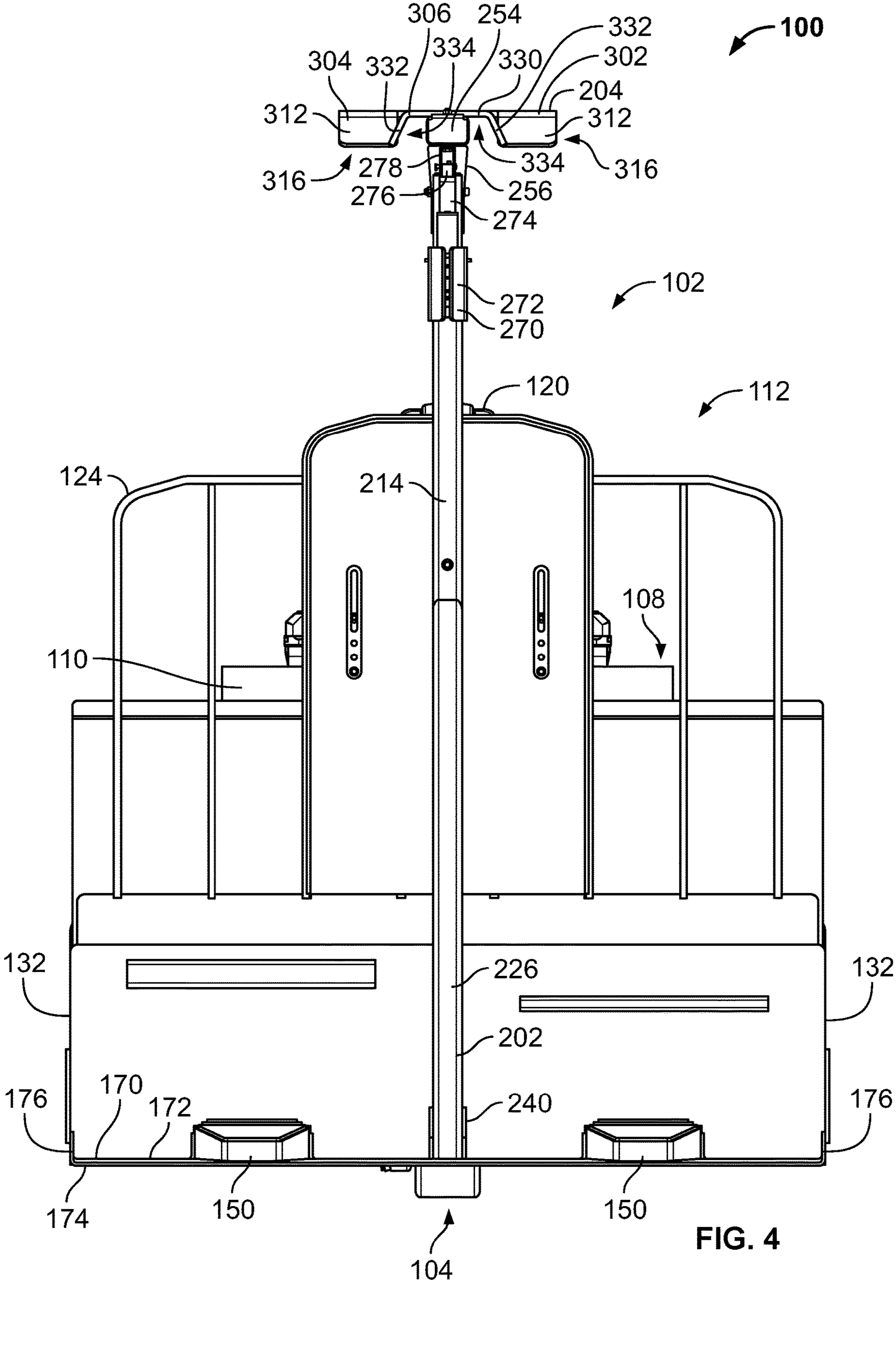
FIG. 4 is a rear elevational view of the material handling vehicle of FIG. 1.

FIGS. 1-6 illustrate one non-limiting example of a material handling vehicle 100 according to the present disclosure. As illustrated in FIGS. 1 and 2, the material handling vehicle 100 may include a vehicle frame 102, a traction wheel 104, a power section 106, a battery compartment 108 for housing a battery 110, and an operator compartment 112. The power section 106 may be disposed within the vehicle frame 102, and the battery 110 may be configured to supply power to various components of the material handling vehicle 100. For example, the battery 110 may supply power to a motor (not shown) and/or transmission (not shown) disposed within the power section 106 and configured to drive the traction wheel 104. In the illustrated non-limiting example, the traction wheel 104 is arranged under the power section 106. In other non-limiting examples, the traction wheel 104 may be arranged in another location under the vehicle frame 102.

Referring to FIGS. 1 and 2, the operator compartment 112 may include a control handle 120 attached to the power section 106 and configured to provide a user interface for an operator and to allow the operator to control a speed and direction of travel of the material handling vehicle 100. In some non-limiting examples, the control handle 120 may be configured to manually steer and control power to the traction wheel 104. In some non-limiting examples, the material handling vehicle 100 may comprise a vehicle console 122 positioned on the power section 106. The vehicle console 122 and the control handle 120 can comprise various buttons or controls to control various features of the material handling vehicle 100. A wall of the operator compartment 112 can provide a load backrest 124 for stabilizing a load on the material handling vehicle 100. The load backrest 124 can also provide a barrier between the operator and the load.

In the illustrated non-limiting example shown in FIGS. 1 and 2, the material handling vehicle 100 includes the operator compartment 112 arranged rearward of the power section 106 and having an operator opening 130 that opens toward lateral sides 132 of the material handling vehicle 100. The operator compartment 112 can define a floor 140 having a mat 142 on which an operator of the material handling vehicle 100 may stand. In some non-limiting examples, the material handling vehicle 100 may be designed with the operator compartment 112 arranged differently, for example, with an operator opening 130 that opens rearward. In the illustrated non-limiting example, the material handling vehicle 100 includes a pair of forks 150 that can be raised or lowered via actuators and/or lift cylinders (not shown) in response to commands from the control handle 120 and/or vehicle console 122.

Referring still to FIGS. 1 and 2, the material handling vehicle 100 may include a platform 170 attached to the forks 150. In some non-limiting examples, the platform 170 may be integral with the forks 150. As illustrated in FIG. 2, the platform 170 may comprise a main body 172 and a ramp 174. The ramp 174 is positioned adjacent the main body 172 and near the rear of the material handling vehicle 100. The main body 172 of the platform 170 may be substantially flat, i.e., parallel with the ground, and the ramp 174 may be inclined with respect to the ground and/or the main body 172. In some non-limiting examples, the main body 172 can by slightly inclined toward the ground. The platform 170 may also comprise sidewalls 176 that are positioned on the lateral sides 132 of the material handling vehicle 100. In some non-limiting examples, the platform 170 is configured to vertically move up and down with the forks 150. Therefore, if the operator raises the forks 150, the operator will raise the platform accordingly. The forks 150 may also comprise wheels 180 (see FIG. 5).

Figure 5:
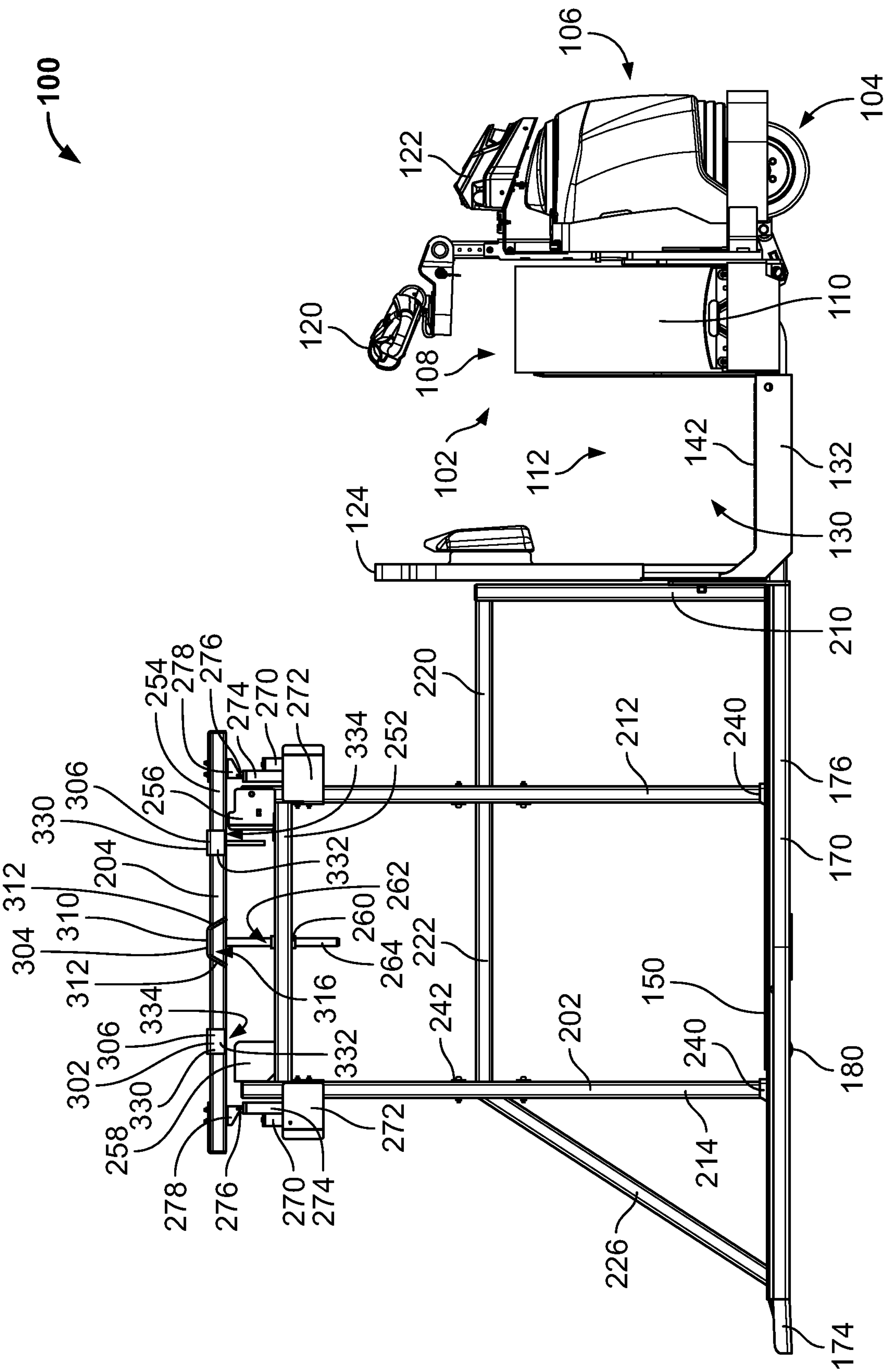
FIG. 5 is a left side elevational view of the material handling vehicle of FIG. 1.

Referring to FIGS. 1, 2, and 5, the material handling vehicle 100 can comprise a post assembly 202 secured with a clamping assembly 204. The post assembly 202 is positioned in the middle of the main body 172 of the platform 170; however, in some non-limiting examples, the post assembly 202 may be adjacent one of the sidewalls 176 of the platform 170. The post assembly 202 can comprise a first vertical post 210, a second vertical post 212, and a third vertical post 214. The vertical posts 210, 212, 214 are generally parallel with respect to one another and are substantially orthogonal with respect to the main body 172 of the platform 170. In some non-limiting examples, the vertical posts 210, 212, 214 may be slightly angled with respect to one another and/or not substantially orthogonal with respect to the main body 172 of the platform 170. The post assembly 202 can also comprise a first horizontal post 220, a second horizontal post 222, and an angled post 226. The first horizontal post 220 and the second horizontal post 222 may be coplanar and/or parallel with each other. As illustrated in FIG. 5, the horizontal posts 220, 222 are orthogonal with respect to the vertical posts 210, 212, 214, and substantially parallel with respect to the main body 172 of the platform 170 (see FIG. 2). In some non-limiting examples, the horizontal posts 220, 222 may be angled with respect to one another and/or may not be substantially parallel with respect to the main body 172 of the platform 170. The angled post 226 may be canted at an angle with respect to the vertical posts 210, 212, 214. Therefore, the angled post 226 may define a triangle between the third vertical post 214 and the main body 172 of the platform 170. As illustrated in FIG. 2, the angled post 226 may comprise an angle θ (theta). In some non-limiting examples, the angle θ (theta) can be between about 10 degrees and about 80 degrees, or between about 20 degrees and about 70 degrees, or between about 30 degrees and about degrees, or between about 55 degrees and about 60 degrees, or about 57 degrees, or at least 20 degrees, or at least 30 degrees, or at least 40 degrees.

Still referring to FIGS. 1, 2, and 5, one end of the angled post 226 can be secured with the main body 172 of the platform 170 while the other end is attached to the third vertical post 214 near an end of the second horizontal post 222. As illustrated in FIG. 1, the vertical posts 210, 212, 214 may be secured to the main body 172 of the platform 170 by a plurality of brackets 240. In some non-limiting examples, the first vertical post 210 may be welded or attached to the load backrest 124. The post assembly 202 can also comprise a plurality of removable covers 242 at the junctures between the vertical posts 210, 212, 214 and the horizontal posts 220, 222 (see FIG. 1). As noted herein, the vertical posts 210, 212, 214, the horizontal posts 220, 222, and the angled post 226 can be hollow and comprise electrical or harness routing therethrough. If removed, the plurality of removable covers 242 may provide access to the internal structure of the post assembly 202. It is contemplated that the length and widths of the vertical posts 210, 212, 214, the horizontal posts 220, 222, and the angled post 226 may be larger or smaller than shown. Further, in some non-limiting examples, the vertical posts 210, 212, 214 may be attached to the platform 170 without the plurality of brackets 240.

In some non-limiting examples, the vertical posts 210, 212, 214, the horizontal posts 220, 222, and/or the angled post 226 may be welded together. Furthermore, in some non-limiting examples, the vertical posts 210, 212, 214, the horizontal posts 220, 222, and/or the angled post 226 may be secured to one another by various fastening mechanisms, such as fasteners, rivets, nails, bolts, cables, clamps, slidable fastening systems, or hooks. Still further, in some non-limiting examples, the material handling vehicle 100 may comprise more than one post assembly 202. For example, the material handling vehicle 100 may comprise two post assemblies 202 on opposite sides of the main body 172 of the platform 170, i.e., each of the post assemblies 202 being adjacent the sidewalls 176 of the platform 170 or each of the post assemblies 202 being positioned over the forks 150. Further, in some non-limiting examples, the vertical posts 210, 212, 214, the horizontal posts 220, 222, and/or the angled post 226 may be formed from a metal, such as steel, aluminum, iron, and/or magnesium. Furthermore, in some non-limiting examples, the post assembly 202 may include more vertical posts 210, 212, 214, horizontal posts 220, 222, and/or angled posts 226 than shown.

Figure 7:
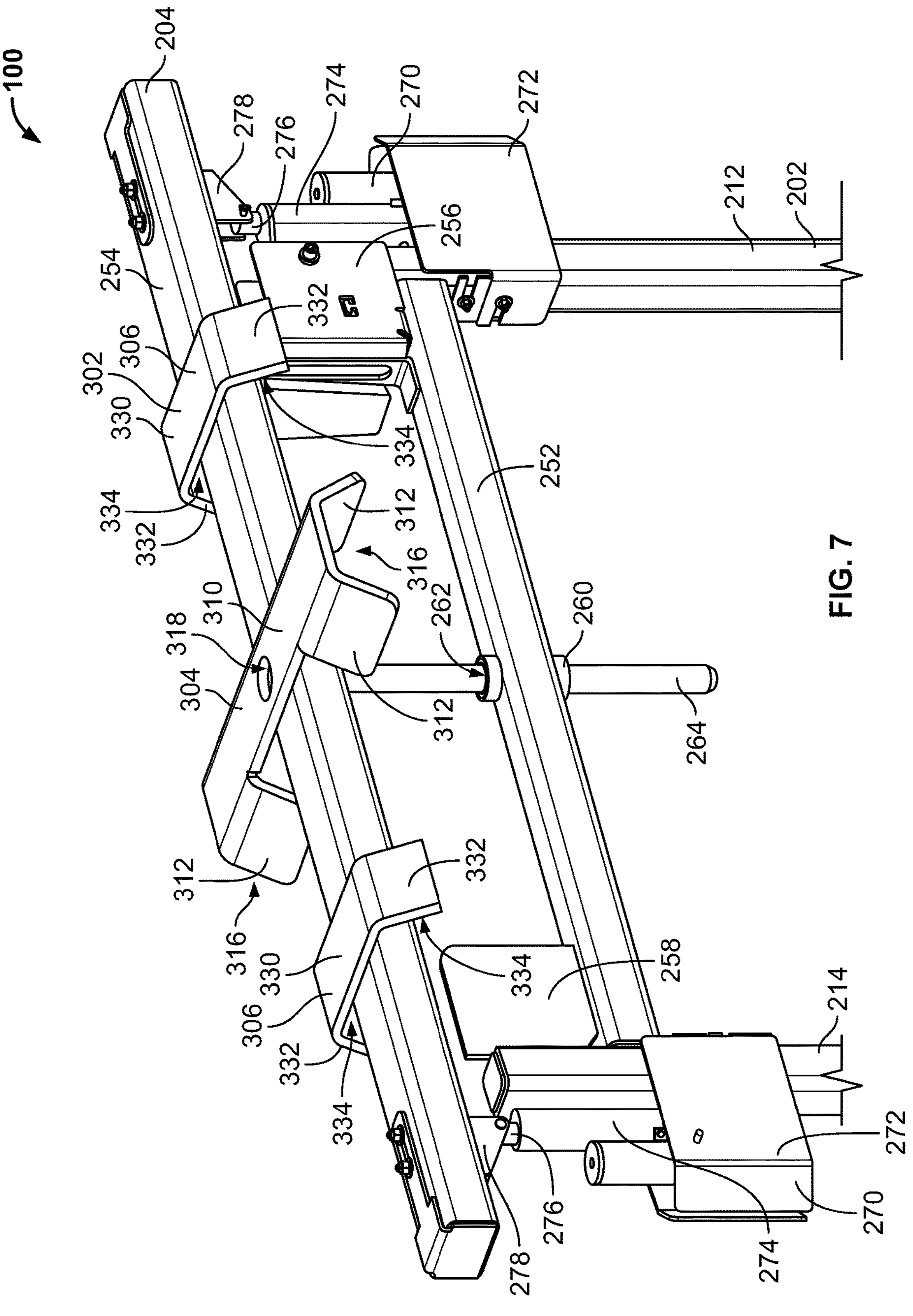
FIG. 7 is a top, rear, and left isometric view of a clamping assembly of the material handling vehicle of FIG. 1 in a first state.
Figure 8:
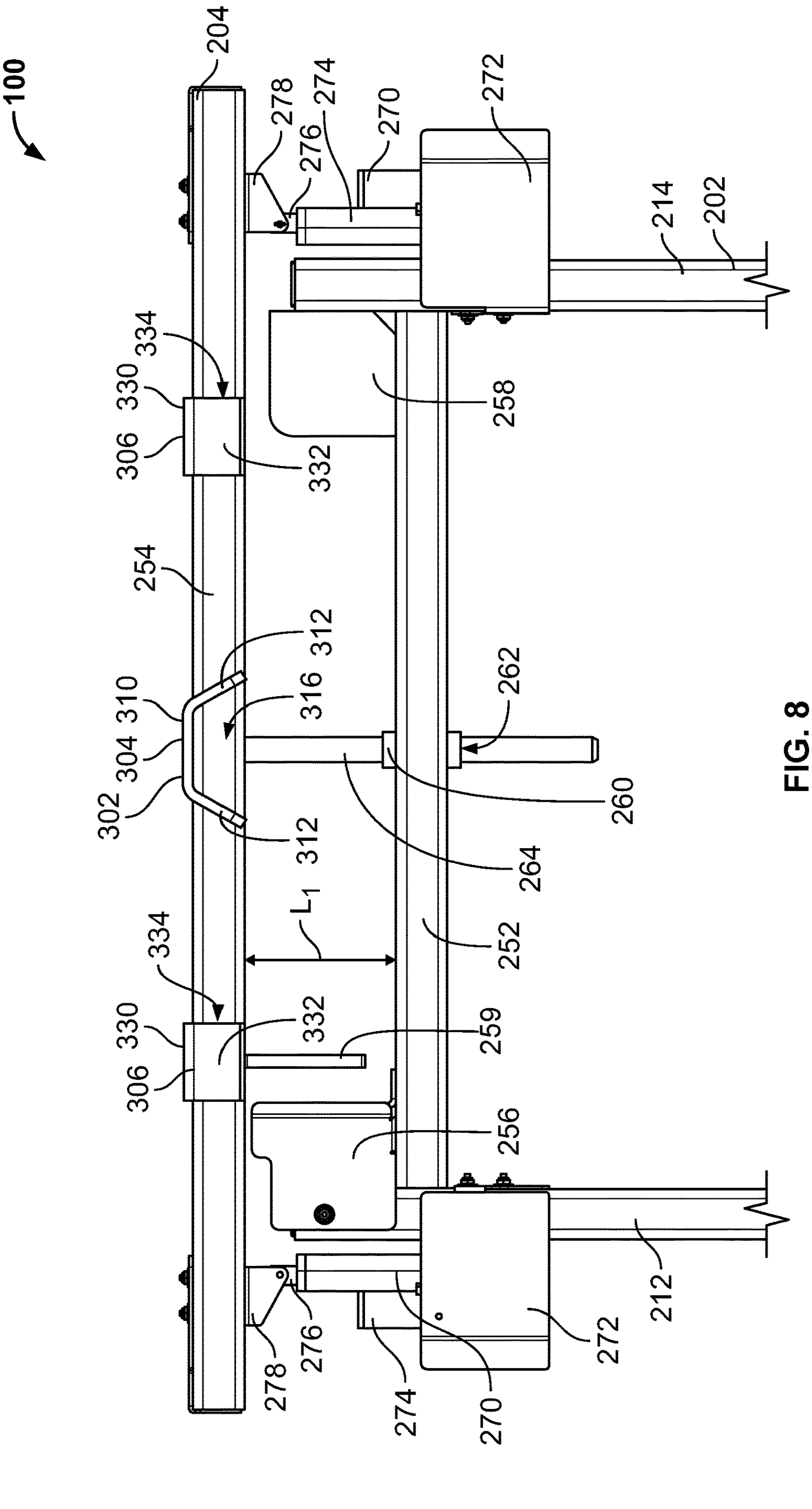
FIG. 8 is a right side elevational view of the clamping assembly of FIG. 7 in the first state.

FIGS. 7 and 8 illustrate one non-limiting example of the clamping assembly 204 of the material handling vehicle 100 in a first state. The clamping assembly 204 can comprise a third horizontal post 252 and a clamping bar 254 positioned above the third horizontal post 252. The third horizontal post 252 can be substantially parallel with the first or second horizontal posts 220, 222, and can be secured to the second and third vertical posts 212, 214. As illustrated in FIGS. 7 and 8, the third horizontal post 252 is secured to the second vertical post 212 and the third vertical post 214. The clamping assembly 204 can further comprise a housing 256 and a fin 258. The housing 256 can be secured to the third horizontal post 252 and the second vertical post 212, and the housing 256 may be configured to cover one or more sensors. The fin 258 may comprise various text or decals thereon. Further, the clamping assembly 204 can further comprise a plate 259 positioned between the third horizontal post 252 and the clamping bar 254, adjacent the housing 256. The plate 259 can be secured with the clamping bar 254. In some non-limiting examples, the third horizontal post 252 may be welded to and/or fastened to the second and/or third vertical posts 212, 214. A cylindrical sleeve 260 may extend through a middle of the third horizontal post 252 and define a passageway 262 therethrough, and a guide rod 264 can extend through the passageway 262 of the cylindrical sleeve 260. The cylindrical sleeve 260 may comprise a bearing within the passageway 262 that guides or moves the guide rod 264. The guide rod 264 can be attached to the clamping bar 254 and can move or slide within the cylindrical sleeve 260 (via the bearing) while the clamping bar 254 moves.

Referring still to FIGS. 7 and 8, the clamping assembly 204 can further include two actuator assemblies 270 on opposite sides of the clamping assembly 204. Each of the actuator assemblies 270 can include an actuator bracket 272 and an actuator 274 secured within the actuator bracket 272. The actuator brackets 272 can protect the actuators 274. In some non-limiting examples, the actuators 274 may be dual lifting actuators and have a 3" (7.6 cm) stroke. Further, in some non-limiting examples, the actuators 274 may have a 4" (10.2 cm), 5" (12.7 cm), or 6" (15.2 cm) stroke. However, it is contemplated that any type of actuator or linear actuator may be used as the actuators 274. As illustrated in FIGS. 7 and 8, each of the actuators 274 comprises an actuation rod 276 that may be secured to a clamping bracket 278 that is attached with the clamping bar 254. As will be discussed in greater details herein, the actuation rods 276 of the actuators 274 can be configured to move the clamping bar 254 up and down relative to the material handling vehicle 100. Put differently, only the clamping bar 254 can move linearly while the actuation rods 276 translate. Specifically, during use, the actuation rods 276 are configured to linearly slide, i.e., move, within the actuators 274 between a first position, i.e., corresponding to the first state (see FIGS. 7 and 8), and a second position, i.e., corresponding to the second state (see FIG. 9), and any position therebetween. In some non-limiting examples, the actuators 274 may comprise an electric motor, a hydraulic motor, and/or a pneumatic control valve that linearly translates the actuation rods 276 between the first position and the second position.

Referring still to FIGS. 7 and 8, the clamping bar 254 can be substantially parallel with respect to the third horizontal post 252 and extend between the actuator assemblies 270. As illustrated in FIG. 8, the clamping bar 254 can extend beyond the actuators 274 and the actuator brackets 272. As discussed above, the clamping bar 254 can be attached with the guide rod 264 at the center of the clamping bar 254. As illustrated in FIGS. 7 and 8, the clamping bar 254 can comprise a plurality of clamps 302 secured thereon. In some non-limiting examples, the plurality of clamps 302 may be welded onto the clamping bar 254. Further, in some non-limiting examples, the plurality of clamps 302 may be fastened to the clamping bar 254 by a plurality of fasteners or fastening mechanisms, such as fasteners, rivets, nails, bolts, cables, clamps, slidable fastening systems, or hooks.

The plurality of clamps 302 may include a main clamp 304 and a plurality of auxiliary clamps 306. The main clamp 304 may comprise a main clamp body 310 and a plurality of main clamp wings 312 extending from the main clamp body 310 at four corners of the main clamp body 310. As illustrated in FIG. 8, the plurality of main clamp wings 312 can extend downwardly and away from the main clamp body 310. In particular, each side of the main clamp body 310 of the main clamp 304 includes two main clamp wings 312 extending therefrom (see FIG. 6). The two main clamp wings 312 on each side of the main clamp body 310 diverge from one another and form a main clamping cavity 316 between the main clamp wings 312. As illustrated in FIG. 7, the main clamp 304 can comprise an aperture 318 extending through the main clamp 304 and the clamping bar 254. As noted herein, the main clamp 304 can comprise 4 main clamp wings 312 thereon. However, in some non-limiting examples, the main clamp 304 may comprise 1, 2, 3, 4, 5, 6, 7, 8, or more main clamp wings 312 thereon. As further noted herein, the angle of the main clamp wings 312, i.e., angle defined between each main clamp wing 312 and a line perpendicular to the ground (or orthogonal to the clamping bar 254, see FIG. 8), can be between about 20 degrees and about 40 degrees, or about 30 degrees.

Still referring to FIGS. 7 and 8, each of the plurality of auxiliary clamps 306 can include an auxiliary clamp body 330 and two auxiliary clamp wings 332. The auxiliary clamp wings 332 are positioned on opposite sides of the auxiliary clamp body 330 and can extend down and away from the auxiliary clamp body 330. The area between the clamping bar 254 and the auxiliary clamp wings 332 can define an auxiliary clamping cavity 334. As illustrated in FIGS. 7 and 8, the clamping bar 254 comprises a single main clamp 304 positioned between two auxiliary clamps 306. However, it is contemplated that the clamping bar 254 can comprise any number and/or configuration of the main clamp 304 and the plurality of auxiliary clamps 306. In some non-limiting examples, the clamping bar 254 can comprise 1, 2, 3, 4, 5, 6, 7, or more main clamps 304 and 1, 2, 3, 4, 5, 6, 7, 8, 9, 10, or more auxiliary clamps 306. As illustrated in FIGS. 7 and 8, the clamping bar 254 is illustrated in the first state. As discussed above, the clamping bar 254 is configured to linearly move between the first state and a second state (see FIG. 9). As noted herein, each of the plurality of auxiliary clamps 306 can comprise two auxiliary clamp wings 332. However, in some non-limiting examples, each of the plurality of auxiliary clamps 306 may comprise 1, 2, 3, 4, 5, 6, 7, 8 or more auxiliary clamp wings 332.

Figure 6:
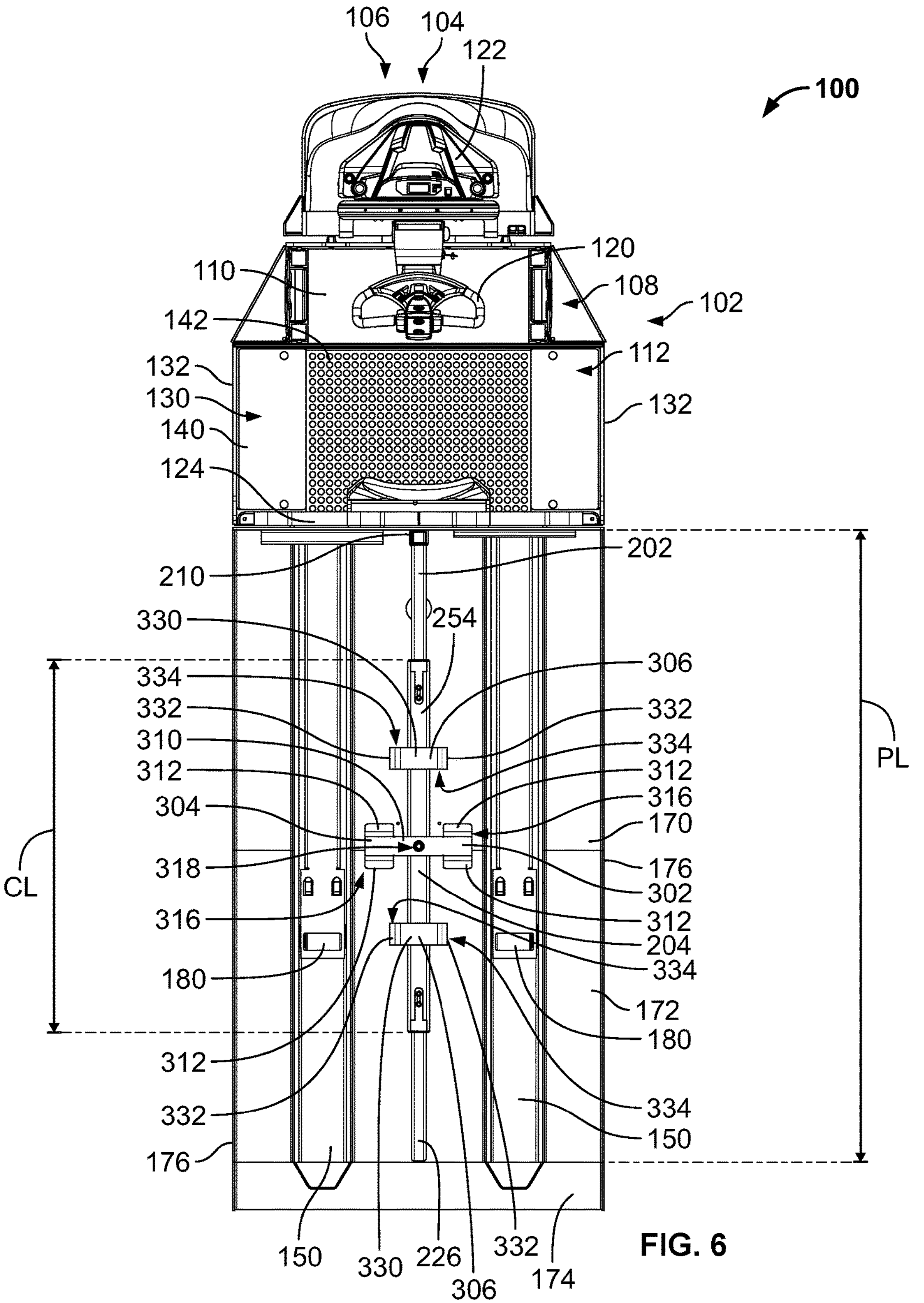
FIG. 6 is a top plan view of the material handling vehicle of FIG. 1.

Referring back to FIG. 6, the clamping bar 254 extends along the platform 170 between the forks 150. In some non-limiting examples, the clamping bar 254 may only extend along a portion of the platform 170. In other words, the clamping bar 254 may not extend from the load backrest 124 to the ramp 174. As illustrated in FIG. 6, the platform 170 can comprise a platform length PL and the clamping bar 254 can comprise a clamping bar length CL. In some non-liming examples, the platform length PL can be about 89" (226.1 cm) and the clamping bar length CL can be about 52" (132.1 cm). In some non-limiting examples, the clamping bar length CL can be between about 10 percent and about 90 percent of the platform length PL, or between about 20 percent and about 80 percent of the platform length PL, or between about 40 percent and about 75 percent of the platform length PL, or between about 50 percent and about 60 percent of the platform length PL, or between about 55 percent and about 60 percent of the platform length PL, or about 58 percent of the platform length PL. In some non-limiting examples, the clamping bar length CL can be less than about 99 percent of the platform length PL, or less than about 95 percent of the platform length PL, or less than about 90 percent of the platform length PL, or less than about 80 percent of the platform length PL, or less than about 75 percent of the platform length PL, or less than about 70 percent of the platform length PL, or less than about 65 percent of the platform length PL, or about 60 percent of the platform length PL. Since the clamping bar length CL is smaller than the platform length PL, the clamping bar 254 can take up less space and allow more access on the platform 170.

Figure 9:
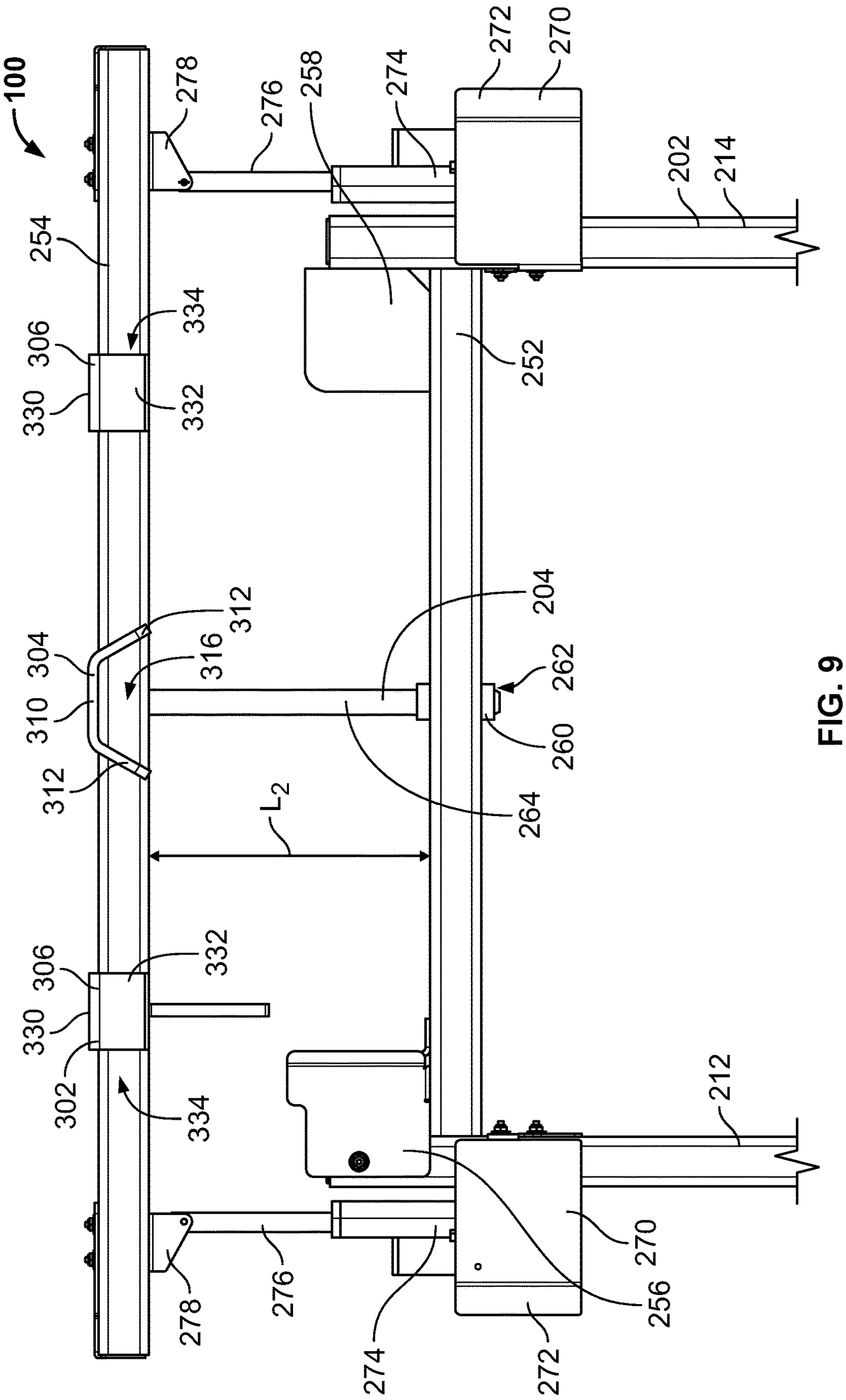
FIG. 9 is a right side elevational view of the clamping assembly of FIG. 7 in a second state.

FIG. 9 illustrates the clamping assembly 204 of the material handling vehicle 100 in the second state. As will be discussed in greater detail herein, the clamping bar 254 can linearly move between the first state, i.e., closed state (see FIGS. 7 and 8), and the second state, i.e., open state (see FIG. 9). During use, the actuation rods 276 of the actuators 274 are configured to lift the clamping bar 254 away from or toward the third horizontal post 252, depending on the desired position of the operator. As the actuation rods 276 of the actuators 274 lift the clamping bar 254 away from the third horizontal post 252, the guide rod 264 will move, i.e., slide, relative to the cylindrical sleeve 260. The guide rod 264 helps guide the clamping bar 254 as it moves up and down. As will be discussed in greater detail below, in some non-limiting examples, the clamping assembly 204 may comprise a third state that is between the first state and the second state.

Referring again to FIGS. 8 and 9, the distance between the clamping bar 254 and the third horizontal post 252 comprises a length $L_1$ in the first state (see FIG. 8) and a length $L_2$ (see FIG. 9) in the second state. As noted herein, the length $L_2$ is greater than the length $L_1$. In some non-limiting examples, the length $L_1$ can be between about 10 percent and about 99 percent of the length $L_2$, or between about 20 percent and about 90 percent of the length $L_2$, or between about 40 percent and about 80 percent of the length $L_2$, or between about 50 percent and about 70 percent of the length La. In some non-limiting examples, the length $L_1$ can be less than about 99 percent of the length $L_2$, or less than about 95 percent of the length $L_2$, or less than about 90 percent of the length $L_2$, or less than about 80 percent of the length $L_2$, or less than about 70 percent of the length $L_2$, or less than about 60 percent of the length $L_2$, or less than about 50 percent of the length $L_2$, or less than about 40 percent of the length $L_2$, or less than about 30 percent of the length $L_2$, or less than about 20 percent of the length La.

Figure 10:
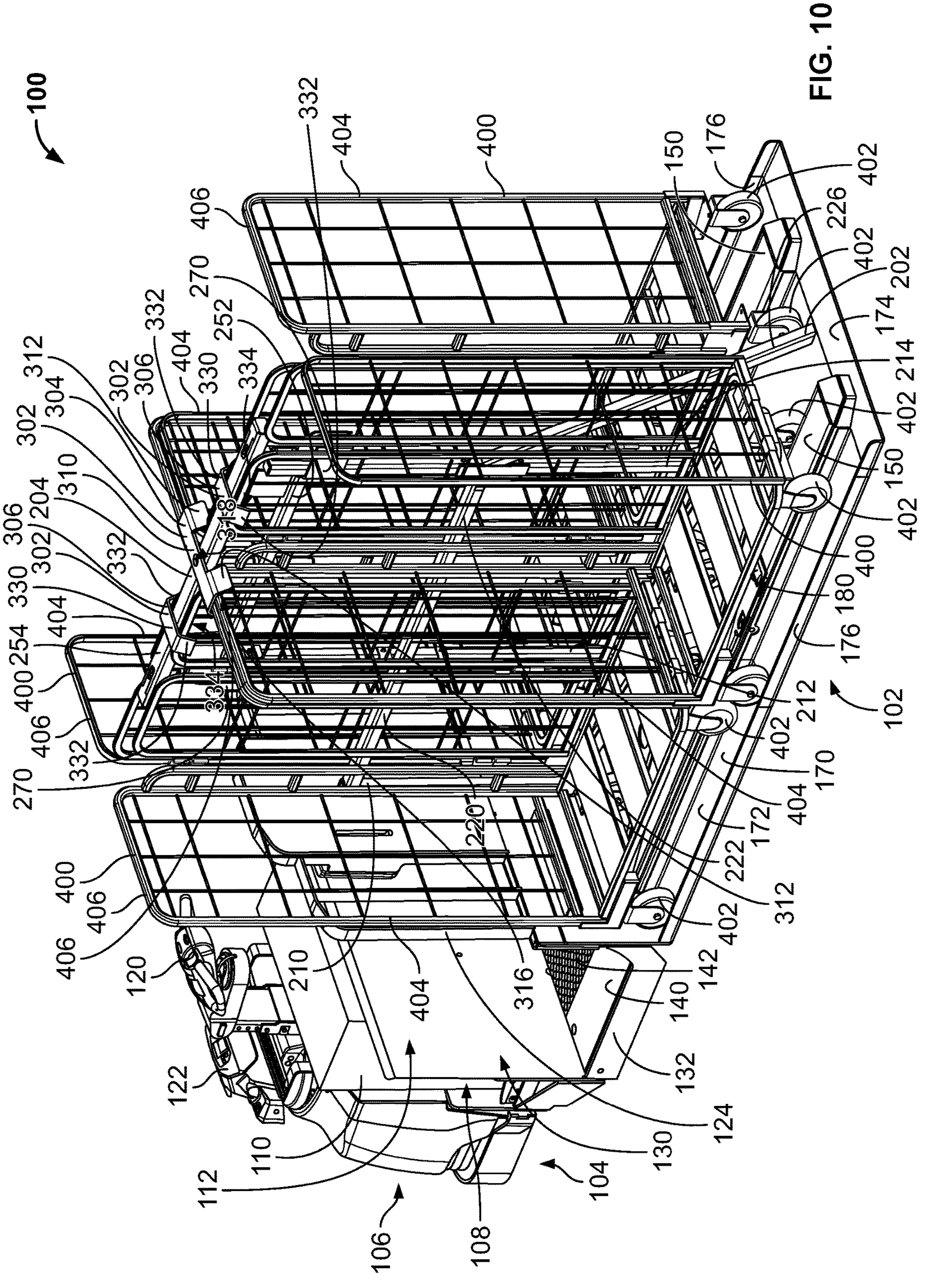
FIG. 10 is a top, rear, and right isometric view of the material handling vehicle of FIG. 1 with a plurality of carts thereon.
Figure 11:
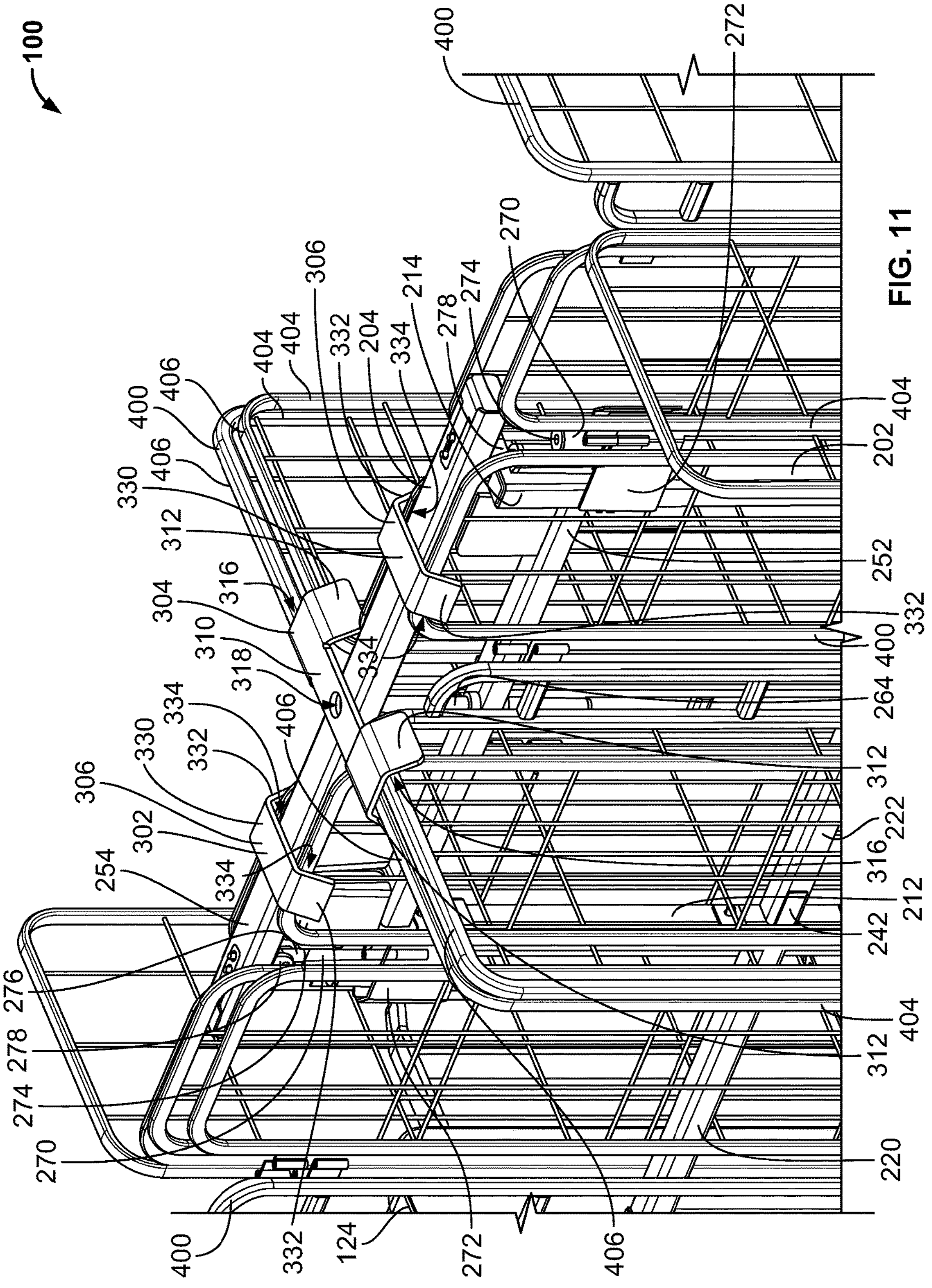
FIG. 11 is a top, rear, and right isometric view of the clamping assembly of the material handling vehicle of FIG. 10.

FIGS. 10 and 11 illustrate the material handling vehicle 100 with a plurality of carts 400 on the platform 170. During use, the material handling vehicle 100 can be configured to move and/or transfer the plurality of carts 400 from one location to another. Therefore, the plurality of carts 400 can be loaded on the material handling vehicle 100, filled, and subsequently unloaded therefrom. As illustrated in FIG. 10, each of the plurality of carts 400 are positioned over one of the forks 150. Specifically, wheels 402 of the plurality of carts 400 are positioned on opposite sides of the forks 150. Once the plurality of carts 400 are loaded onto the material handling vehicle 100, the clamping assembly 204 can be configured to secure the plurality of carts 400 to the material handling vehicle 100.

As illustrated in FIG. 11, the plurality of clamps 302 on the clamping bar 254 are configured to engage with a frame 404 on each of the plurality of carts 400. In particular, the main clamp 304 is configured to contact all four of the plurality of carts 400 and secure the same within the main clamping cavities 316, and the plurality of auxiliary clamps 306 are each configured to contact two of the plurality of carts 400 and secure the same within the auxiliary clamping cavities 334. Put differently, each of the main clamp wings 312 of the main clamp 304 holds the frame 404 of two of the plurality of carts 400, and each of the auxiliary clamp wings 332 holds the frame 404 of one of the plurality of carts 400. As a result, portions of the frames 404 of the plurality of carts 400 can be positioned within the main clamping cavities 316 and the auxiliary clamping cavities 334. As noted herein, the material handling vehicle 100 is illustrated with four carts 400 thereon. However, it is contemplated that the material handling vehicle 100 can carry any number of carts 400 thereon. For example, in some non-limiting examples, the material handling vehicle 100 can hold and/or carry 1, 2, 3, 4, 5, 6, 7, 8, 9, or more carts 400. Further, in some non-limiting examples, the plurality of carts 400 may not be in contact with the main clamp 304 or the plurality of auxiliary clamps 306. Instead, portions of the plurality of carts 400 may be positioned inside of the main clamping cavities 316 and the auxiliary clamping cavities 334.

Referring still to FIGS. 10 and 11, the clamping assembly 204 is illustrated in the first state securing the plurality of carts 400 to the material handling vehicle 100. As noted herein, the first state defines a closed or secured position since the plurality of carts 400 can be secured to the platform 170 in the first state. As discussed above, the clamping assembly 204 can move to the second state by vertically translating the clamping bar 254 via the actuation rods 276 of the actuators 274. Therefore, in the second state, the clamping bar 254 is lifted up and the frames 404 of the plurality of carts 400 are not secured within the main clamping cavities 316 of the main clamp 304 and the auxiliary clamping cavities 334 of the plurality of auxiliary clamps 306.

In the second state, the plurality of carts 400 can be moved on and off the platform 170 of the material handling vehicle 100 since the plurality of clamps 302 are not securing the carts 400. The second state defines an open or non-secured position since the plurality of carts 400 are free to move on and off the platform 170. As further noted herein, in some non-limiting examples, the second state may define a maximum limit that the actuation rods 276 of the actuators 274 can move the clamping bar 254. However, in some non-limiting examples, the second state may not define a maximum limit that the actuation rods 276 of the actuators 274 can move the clamping bar 254, i.e., the clamping bar 254 can move to a length that is greater than $L_2$. As such, in some non-limiting examples, the second state may simply define any position where the clamping bar 254 is high enough for the plurality of carts 400 to move on and off of the platform 170, i.e., the second state defines any state in which the plurality of clamps 302 are positioned high enough to not engage with the plurality of carts 400 when they are loaded on and off of the platform 170.

Further, as discussed above, the clamping assembly 204, i.e., the clamping bar 254, can also define a third state that is between the first state and second state. Put differently, the third state can define a position when the clamping bar 254 is between the first state and the second state, i.e., the third state defines a length L3 that is between $L_1$ and $L_2$. Therefore, in some non-limiting examples, after the clamping bar 254 has reached the second state (see FIG. 9), the clamping bar 254 may move down to the third state. The third state can define a position where the clamping bar 254 is positioned just higher than an uppermost portion 406 of the frame 404 of each of the plurality of carts 400. Thus, while in the third state, the operator can still move the plurality of carts 400 on and off the platform 170. By being positioned within the third state, the clamping bar 254 can more quickly clamp the plurality of carts 400 than if the clamping bar 254 is in the second state, i.e. the clamping bar 254 is further away from the uppermost portion 406 of the frame 404 of the plurality of carts 400 when the clamping bar 254 is in the second state than when it is in the third state. In some non-limiting examples, the clamping assembly 204 may not define the third state. As discussed above, in some non-limiting examples, the second state may not define a maximum limit that the actuation rods 276 of the actuators 274 can move the clamping bar 254. In some non-limiting examples, the second state may define the same state as the third state, i.e., the length $L_2$ of the second state is equal to the length of the third state.

Referring to FIG. 10, the platform 170 and the forks 150 of the material handling vehicle 100 are illustrated in a down position or configuration. In other words, the platform 170 and the forks 150 are illustrated in their lowermost position, i.e., the platform 170 and/or the forks 150 are in contact with the ground such that the plurality of carts 400 can be rolled off the ramp 174 without there being a vertical gap between the end of the ramp 174 and the ground. During use, the plurality of carts 400 can only be rolled onto and off the platform 170 via the ramp 174 when the platform 170 and the forks 150 are in the down position. After the plurality of carts 400 are loaded onto the platform 170 and the clamping bar 254 is in the first state, the platform 170 and forks 150 can move to an up position. As noted herein, the up position is defined as any position in which the platform 170 and the forks 150 have been lifted from the down position, i.e., the forks 150 and/or the platform 170 are not in contact with the ground. In some non-limiting examples, the forks 150 and the platform 170 must be in an up position before the material handling vehicle 100 is configured to allow for movement. In some non-limiting examples, the material handling vehicle 100 may be configured to move when the forks 150 and the platform 170 are in the down position. In some non-limiting examples, the material handling vehicle 100 can only move while the forks 150 and the platform 170 are in the up position and the clamping bar 254 is in the first state. In some non-limiting examples, the material handling vehicle 100 can move while the forks 150 and the platform 170 are in the up position and the clamping bar 254 is in the second state. As discussed above, the platform 170 and the forks 150 can be integral with each other. Therefore, if the forks 150 are raised to the up position, the platform 170 is also raised to the up position.

Figure 12:
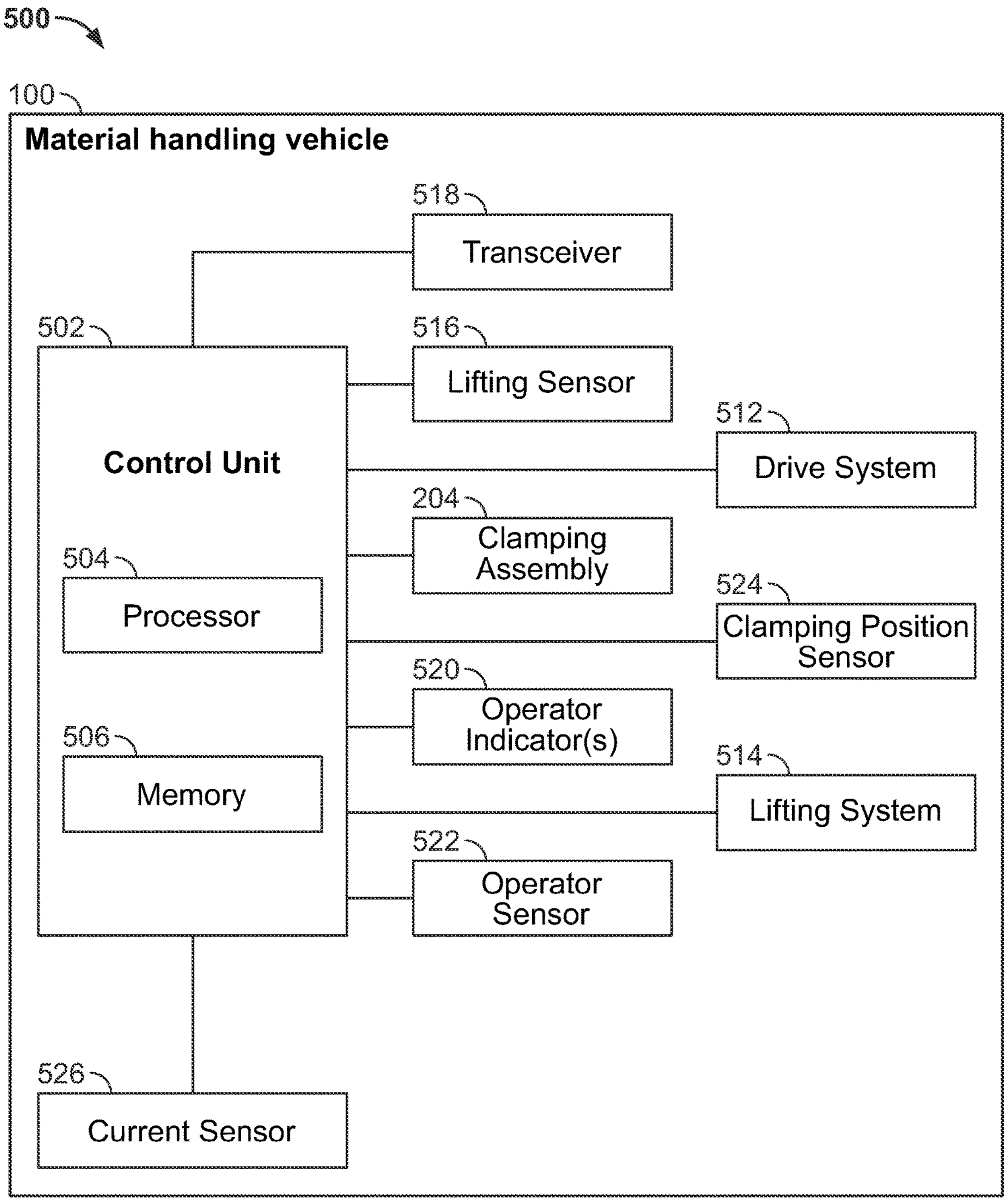
FIG. 12 is a block diagram of a communication and control system of the material handling vehicle of FIG. 1 according to aspects of the present disclosure.

FIG. 12 illustrates a control system 500 for the material handling vehicle 100. The control system 500 can include a control unit 502. The control unit 502 can include a processor 504 for processing and executing instructions stored on a memory 506. It should be appreciated that the control unit 502 may be a stand-alone dedicated controller or integrated within a larger control system within the material handling vehicle 100. It should also be appreciated that the control unit 502 can include more than one processor 504.

In the illustrated non-limiting example, the control unit 502 can be in communication with a variety of vehicle equipment. For example, the control unit 502 can be in communication with a drive system 512. The drive system 512 may provide a motive force for moving the material handling vehicle 100 in a designated travel direction, for example, by driving the traction wheel 104 of the material handling vehicle 100. The control unit 502 can receive drive commands via the drive system 512, for example, via an operator input to the control handle 120, and evaluate those drive commands in accordance with the methods described herein. In some non-limiting examples, the control unit 502 may be separate from the drive system 512. In other words, the control unit 502 may be separate from a truck control unit. The control unit 502 can also be in communication with a lifting system 514 that is used to lift the forks 150 between the down position and the up position. In some non-limiting examples, the lifting system 514 may comprise a plurality of actuators or lifting cylinders to lift the forks 150 and the platform 170. The lifting system 514 may work with a lifting sensor 516 that is also in communication with the control unit 502. Specifically, the lifting sensor 516 may communicate with the control unit 502 to determine when the forks 150 and the platform 170 of the material handling vehicle 100 are in the down or up position. In some non-limiting examples, the lifting sensor 516 may be a position sensor on the actuators and/or lifting cylinders that measures the height of the forks 150 and the platform 170.

In some non-limiting examples, the control unit 502 can communicate via wireless communication with one or more material handling vehicles 100 through a transceiver 518. The communication may occur through one or more of any desired combination of wireless communication mechanisms and any desired network topology (or topologies when multiple communication mechanisms are utilized). Exemplary wireless communication networks include a 5G networks, a BLUETOOTH module, and/or a Wi-Fi transceiver, among others, including the Internet, cellular, satellite, microwave, and radio frequency, for providing data communication between material handling vehicles 100. It is to be understood that, while only one material handling vehicle control system 500 is illustrated in detail in FIG. 12, each of the material handling vehicles 100 would include a substantially identical control system. In some non-limiting examples, the control unit 502 on the material handling vehicle 100 may be in communication with third party system, e.g., a warehouse management system (WMS).

Referring to FIG. 12, the control unit 502 can also be in communication with one or more operator indicators 520, which may prompt visual, auditory, and/or tactile indications if certain conditions are determined, as will be describe herein. For example, one or more light sources on the material handling vehicle 100 or indications on a vehicle display can provide a visual indication. According to some non-limiting examples, a vehicle horn and/or a speaker may provide an audible indication. In some non-limiting examples, a tactile or haptic indication can be provided as a vibration to the operator through the control handle 120, or any other portion of the material handling vehicle 100 that can be in contact with the operator. The control unit 502 can be in communication with an operator sensor 522. The operator sensor 522 may be positioned within or adjacent to the mat 142 on the floor 140 of the operator compartment 112. In some non-limiting examples, the operator sensor 522 may be configured to determine if the operator is standing on the mat 142 in the operator compartment 112. In particular, the operator sensor 522 may comprise weight sensors that convey to the control unit 502 when the operator is on and off the mat 142. In some non-limiting examples, the operator sensor 522 may comprise a camera to determine when the operator is in the operator compartment 112.

Still referring still to FIG. 12, the control unit 502 can also be in communication with a clamping position sensor 524 and a current sensor 526. The clamping position sensor 524 may be configured to determine the height of the clamping assembly 204, i.e., the height of the clamping bar 254 relative to the third horizontal post 252. Put differently, the clamping position sensor 524 may be configured to determine the state, i.e., first state, second state, or third state, that the clamping bar 254 is in. The clamping position sensor 524 may be positioned within or near the actuator assemblies 270 and measure the stroke length of the actuation rods 276 of the actuators 274. In some non-limiting examples, the clamping position sensor 524 can be positioned within the housing 256 and sense the height of the plate 259 (see FIG. 8). In other words, the housing 256 can cover the clamping position sensor 524. Further, in some non-limiting examples, the clamping position sensor 524 may include a proximity sensor that senses the position of the clamping bar 254. Therefore, the clamping position sensor 524 can inform the control unit 502 when the clamping bar 254 has reached its minimum height, e.g., first state, its maximum height, e.g., second state, or a height therebetween, e.g., third state.

The current sensor 526 may be configured to detect the force being used on the plurality of carts 400 while the clamping bar 254 is moving from the second state to the first state and/or while the plurality of carts 400 are being lifted by the platform 170. In other words, the current sensor 526 can be used with the actuators 274 of the actuator assemblies 270 to determine the force being used by the plurality of clamps 302 on the plurality of carts 400. In some non-limiting examples, the current sensor 526 can also be used with the actuators and/or lift cylinders that move the forks 150 and platform 170. Further, in some non-limiting examples, the current sensor 526 can comprise one or more resistors that place an upper limit on an amount of current being drawn through the current sensor 526. As noted herein, higher forces result in a higher than normal current being drawn through the current sensor 526 by the actuators 274 and/or lifting cylinders. Therefore, if the current sensor 526 measures a higher than normal current, i.e., a current above the upper limit, the actuators 274 of the clamping assembly 204 may stop lifting and/or the lift cylinders on the material handling vehicle 100 may stop lifting the forks 150 and platform 170. In some non-limiting examples, a higher current may be registered through the current sensor 526 when one or more of the plurality of carts 400 are not aligned.

Still referring to FIG. 12, the control unit 502 can also be in communication with the clamping assembly 204. In particular, as will be discussed in greater details below, the control unit 502 can be in communication with the actuation rods 276 of the actuators 274 to raise and lower the clamping bar 254 depending on the condition of the material handling vehicle 100. As noted herein, in some non-limiting examples, the control unit 502 can also be in communication with a position system to detect a position or location of the material handling vehicle 100, a steering system to detect the steering of the material handling vehicle 100, a vehicle speed sensor to detect a speed of the material handling vehicle 100, and/or a vehicle brake control system to control the brakes on the material handling vehicle 100. Therefore, it is contemplated that the control unit 502 can be in communication with any electrical or mechanical component on the material handling vehicle 100. Further, in some non-limiting examples, the control unit 502 can be in communication with various sensors and/or inputs that measure various conditions or parameters of the material handling vehicle 100. These conditions or parameters can be processed by the control unit 502 and initiate various outputs that affect the performance of the material handling vehicle 100.

As noted herein, the control unit 502 can be configured to control the operation of the material handling vehicle 100. In some non-limiting examples, the control unit 502 can communicate with the various systems and sensors outlined above via a Controller Area Network (CAN) bus network or another form of wired or wireless communication. It is contemplated that the control unit 502 can be in communication with other portions of the material handling vehicle 100 in any conventional wireless or wired way. In some non-limiting examples, the control unit 502 can be a programmable logic controller (PLC).

Figure 13:
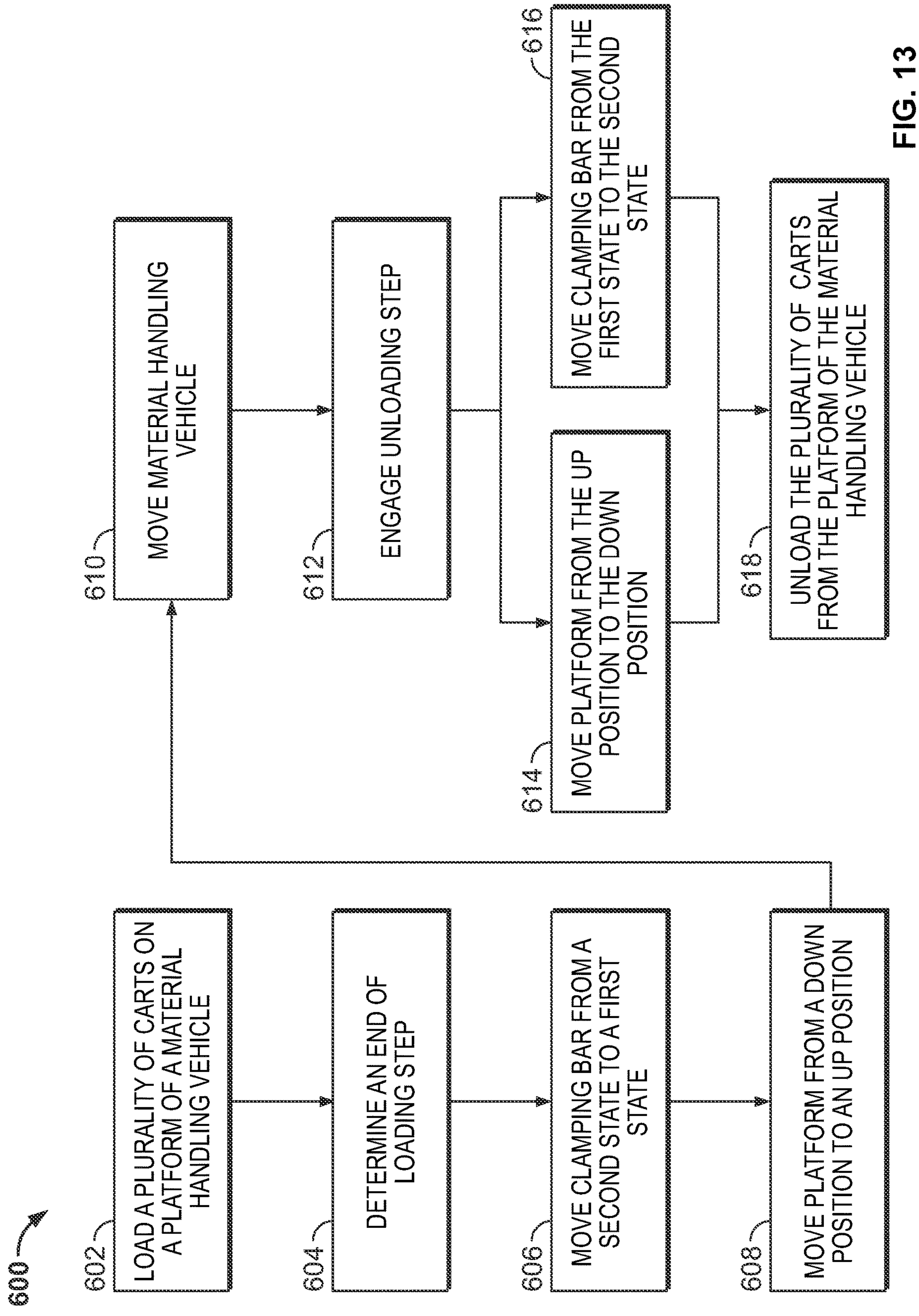
FIG. 13 is a schematic illustration of a process for loading and unloading a material handling vehicle according to aspects of the present disclosure.

Referring now to FIG. 13, a flowchart is depicted of a process 600 for loading and unloading a material handling vehicle 100 in connection with the material handling vehicle 100 and the control unit 502 of FIGS. 1-12. While the example process is described with reference to the flowchart illustrated in FIG. 13, many other methods of using the material handling vehicle 100 may alternatively be used. For example, the order of execution of the blocks may be rearranged, changed, eliminated, and/or combined to perform the process 600.

In step 602, the process 600 includes loading the plurality of carts 400 on the platform 170 of the material handling vehicle 100. As noted herein, in step 602, the platform 170 and the forks 150 are in the down position and the clamping bar 254 is in the second state or the third state. Therefore, in step 602, the operator can load the plurality of carts 400 onto the platform 170 via the ramp 174 since the ramp 174 is in contact with the ground in the down position. As illustrated in FIG. 10, four carts 400 may be loaded onto the platform 170. However, it is contemplated that any number of carts 400 may be added on the platform 170. Once the operator has loaded the appropriate number of carts 400 onto the platform 170, the material handling vehicle 100 can determine an end of the loading step, i.e., step 602, in step 604, once the operator sensor 522 determines or indicates that the operator is in the operator compartment 112. As discussed above, in some embodiments, the operator sensor 522 may be positioned within the mat 142 of the operator compartment 112 and be configured to sense when the operator is standing on the mat 142.

In some non-limiting examples, the operator sensor 522 may be a weight or force sensor within the mat 142 that is configured to sense when a weight or force is placed on the mat 142. Therefore, once the operator steps onto the mat 142, the operator sensor 522 can communicate with the control unit 502 to determine that the loading step has ended at step 604. Once the loading step has ended, i.e., the operator has stepped onto the mat 142, the material handling vehicle 100 may automatically start moving the clamping bar 254 from the second state (or third state) to the first state in step 606. In particular, the clamping bar 254 can automatically move down and secure the plurality of carts 400 to the platform via the plurality of clamps 302, in step 606, after the operator sensor 522 has determined that the operator is in the operator compartment 112 in step 604. Therefore, the operator does not need to initiate any command to have the clamping bar 254 secure to the plurality of carts 400. In some non-limiting examples, the operator may manually press a button to indicate to the control unit 502 that the loading step has been finished.

Once the clamping bar 254 has reached the first state, the forks 150 and the platform 170 can automatically start to move from the down position to the up position in step 608. In particular, in step 608, the platform 170 can move once the control unit 502 has confirmed that the clamping bar 254 is in the first state. In some non-limiting examples, the clamping position sensor 524 may indicate to the control unit 502 that the clamping bar 254 has reached the first state, thereby initiating step 608. Thus, the forks 150 and the platform 170 may not be able to move until the control unit 502 has confirmed that the clamping bar 254 has reached the first state.

As the clamping bar 254 moves from the second state (or third state) to the first state and as the platform 170 (via the forks 150) move from the down position to the up position, the current sensor 526 may be continuously monitoring the current going through the actuators 274 and/or the lifting cylinders/actuators to make sure that the current limit has not been reached. If the current rises above the limit, the current sensor 526 can indicate to the control unit 502 to stop the clamping process. In one non-limiting example, one of the carts 400 may be stuck or misaligned. Therefore, as the clamping bar 254 moves down, the current sensor 526 may be able to detect a high current resulting from additional forces needed to lower the clamping bar 254 due to the misaligned cart. If the current limit is reached, the control unit 502 can automatically stop the movement of the clamping bar 254 and return the clamping bar 254 to the second state (or third state). In some non-limiting examples, the control unit 502 may alert the operator via the operator indicator 520 that an overcurrent condition, i.e., current limit is reached, has occurred.

Once the platform 170 and the forks 150 have reached the up position, the material handling vehicle 100 can move in step 610. In particular, once the clamping bar 254 is in the first state and the platform 170 is in the up position, the operator can move the material handling vehicle 100 to its desired location(s). As noted herein, the material handling vehicle 100 may be configured to move to various locations while the plurality of carts 400 are loaded onto the platform 170. In some non-limiting examples, the plurality of carts 400 can be loaded onto the material handling vehicle 100 in an empty state, similar to FIG. 10. Then, the material handling vehicle 100 may move to multiple locations throughout the warehouse, for example, to fill the plurality of carts 400. Once the plurality of carts 400 have been filled, the material handling vehicle 100 may be moved to a specific location to unload the plurality of carts 400. In some non-limiting examples, the plurality of carts 400 may be unloaded near a plurality of trucks or within truck trailers.

In step 612, the process 600 includes engaging an unloading step. In some non-limiting examples, the unloading step may be engaged by the operator pressing a button or initiating a specific task on the vehicle console 122 or control handle 120. For example, once the material handling vehicle 100 is positioned at its desired unloading location, the operator may press a button on the vehicle console 122 or the control handle 120 to engage the unloading step. Once the unloading step is engaged, the platform 170 can move from the up position to the down position in step 614 and the clamping bar 254 can move from the first state to the second state in step 616. As noted herein, the platform 170 and the clamping bar 254 can move at the same time once the operator has engaged the unloading step. Therefore, once the operator engages the unloading step, the material handling vehicle 100 will automatically lower the platform 170 and raise the clamping bar 254 thereafter.

As discussed above, the current sensor 526 can stop the movement of the clamping bar 254 if the current limit is exceeded. Once the clamping bar 254 has reached the second state and the platform 170 has reached the down position, the operator can unload the plurality of carts 400 from the platform 170, in step 618, via the ramp 174. In some non-limiting examples, after the clamping bar 254 has reached the second state, the clamping bar 254 will lower to the third state for unloading the plurality of carts 400. As discussed above, it can be quicker for the clamping bar 254 to get back to the first state from the third state than the second state. Therefore, it is advantageous for the clamping bar 254 to move to the third state after (or before) the plurality of carts 400 have been removed from the platform 170. After the plurality of carts 400 are unloaded off of the platform 170, the operator can move back onto the mat 142 in the operator compartment 112 to trigger the clamping bar 254 to lower and the platform 170 to raise such that the material handling vehicle 100 can move to load additional carts 400 and repeat the process 600.

As discussed above, the process 600 can assist the operator during loading and unloading of the plurality of carts 400. In particular, the material handling vehicle 100 and the control unit 502 can help to reduce the number of steps required by the operator. For example, as discussed above, once the plurality of carts 400 are loaded onto the platform 170, the material handling vehicle 100 can automatically begin lowering the clamping bar 254 and raising the platform 170 once the operator sensor 522 has determined that the operator is in the operator compartment 112. This process 600 can reduce the loading and unloading time. In one non-limiting example, the operator steps onto the mat 142 and the clamping bar 254 will automatically lower and the forks 150 and the platform 170 will rise thereafter. Further, during unloading of the carts 400, the operator can press a single button or indicate a single condition and the platform 170 will then lower and the clamping bar 254 will raise. By reducing the amount of steps performed by the operator, the material handling vehicle 100 can allow more loading and unloading cycles of the carts 400. Furthermore, the current sensor 526 allows the control unit 502 (and the operator) to assess if the carts 400 are properly configured on the platform 170.

Figure 14A:
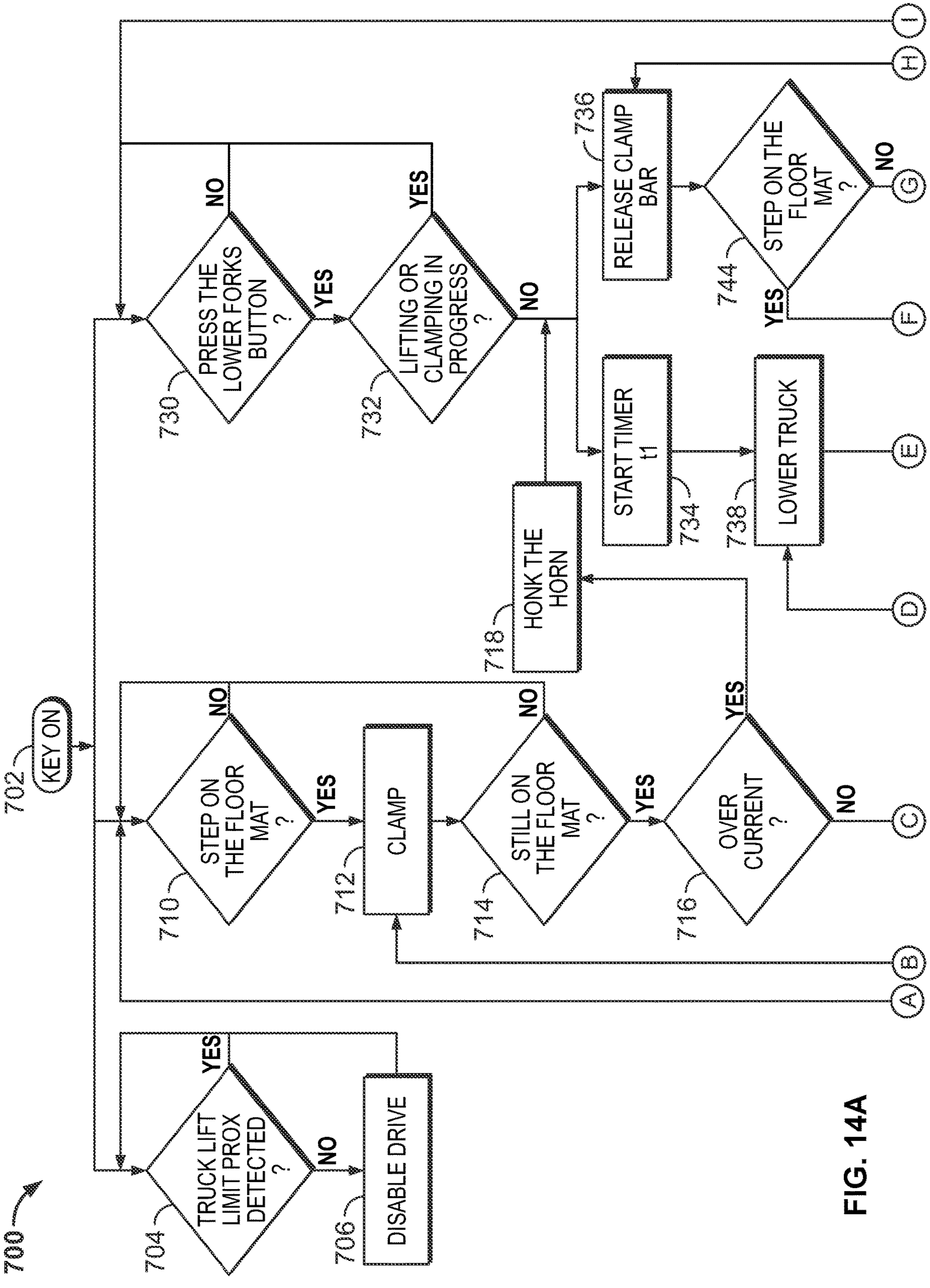
FIG. 14A is another schematic illustration of a process for loading and unloading a material handling vehicle according to aspects of the present disclosure.
Figure 14B:
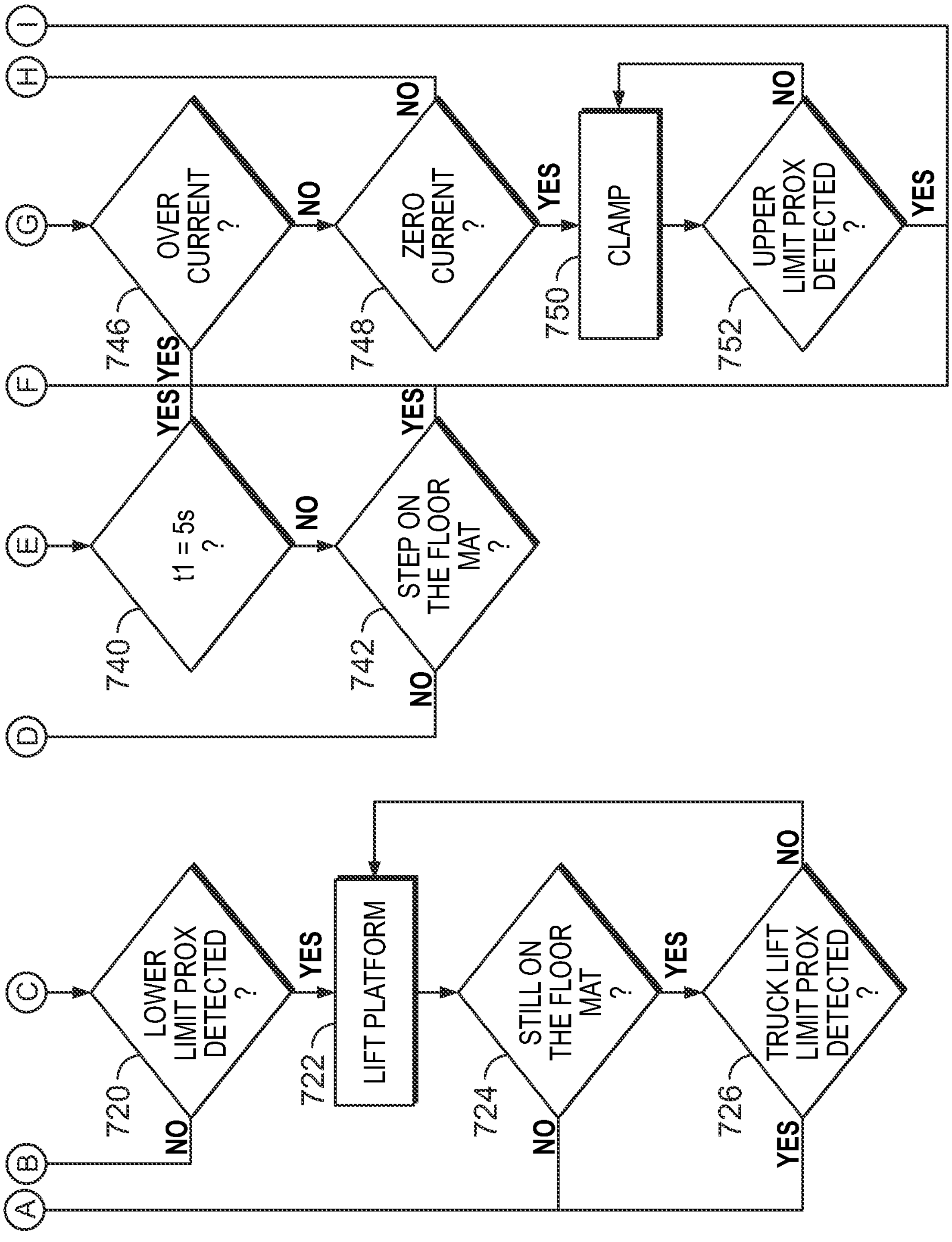
FIG. 14B is a continuation of the schematic illustration of FIG. 14A.

FIGS. 14A and 14B illustrate a flowchart of a process 700 the control unit 502 and the material handling vehicle 100 may undergo during loading and unloading. Specifically, the process 700 illustrates the steps that the control unit 502, e.g., PLC controller, may be programed to perform while the operator is using the material handling vehicle 100. Therefore, these steps may perform automatically depending on the inputs and conditions provided by the operator. As noted herein, the process 700 is similar to the process 600. While the example process is described with reference to the flowchart illustrated in FIGS. 14A and 14B, many other processes of using the control unit 502 and the material handling vehicle 100 may alternatively be used. For example, the order of execution of the blocks may be rearranged, changed, eliminated, and/or combined to perform the process 700. As noted herein, the process 700 outlines the steps for loading and unloading the plurality of carts 400 onto the platform 170 of the material handling vehicle 100. As further noted herein, FIGS. 14A and 14B illustrate a single flowchart. However, due to the size of the flowchart, the flowchart has been broken up between FIGS. 14A and 14B in order for the text and processes to be clear.

In step 702, the operator may turn on the material handling vehicle 100. In some non-limiting examples, the operator may use a key to turn on the material handling vehicle 100. However, it is contemplated that the material handling vehicle 100 may be turned on in any conventional way, i.e., push button, ignition switch, remote start, etc. Once the material handling vehicle 100 is turned on, the process 700 can begin.

In step 704, the control unit 502 can detect if the platform 170 (and thus the forks 150) is in the up position, i.e., lift limit. In particular, the lifting sensor 516 can communicate with the control unit 502 to determine the position of the platform 170. If the platform 170 is in the up position, i.e., the limit has been detected, the process 700 will continue to perform normally. In other words, the material handling vehicle 100 can move around while the platform 170 is in the up position. If the platform 170 is not in the up position, i.e., the truck lift limit is not detected, the process 700 can proceed to step 706 where the control unit 502 can disable the material handling vehicle 100 from driving. In other words, at step 706, the material handling vehicle 100 will not be able to move until the lifting sensor 516 has determined that the platform 170 is in the up position, i.e., the truck lift limit is detected. As noted herein, the control unit 502 is continuously monitoring to see if the platform 170 is in the up position. Therefore, step 706 may be implemented at any time throughout the process 700.

In step 710, the control unit 502 can detect if the operator has stepped on the mat 142 within the operator compartment 112. As discussed above, the operator sensor 522 may be used to detect if the operator has stepped onto the mat 142. If the operator has stepped on the mat 142 in step 710, the process 700 will proceed to step 712 where the clamping bar 254 will start to lower from the second or third state to the first state to secure the plurality of carts 400 to the platform 170. In some embodiments, the clamping bar 254 can be positioned in the third state and lowered to the first state in step 712. If at step 710, the operator sensor 522 does not sense that the operator has stepped onto the mat 142, the process 700 will continue to loop until the operator has stepped on the mat 142 in the operator compartment 112. While the operator is on the mat 142, the clamping bar 254 will continue to move from the second or third state to the first state. However, while the clamping bar 254 is moving, the control unit 502 may continually monitor to see if the operator is still on the mat 142 in step 714. If the operator moves off of the mat 142 while the clamping bar 254 is lowering, the control unit 502 may stop the movement of the clamping bar 254 and the process 700 can return to the top of the flowchart in FIG. 14A. In some non-limiting examples, the clamping bar 254 may move back to the third or second state if the operator moves off the mat 142 during movement of the clamping bar 254.

If the operator is still on the mat 142 during step 714, the process 700 may continue to step 716 to detect if the current sensor 526 has detected a current over the limit. As discussed above, the current sensor 526 can be used to detect the amount of current running through the actuators 274. If a higher-than-normal force is required by the actuators 274, a higher current will be detected by the current sensor 526. If at step 716 the current is higher than the limit, the process 700 can proceed to step 718 and initiate the operator indicator 520. In some non-limiting examples, the operator indicator 520 may include an audible response such as the honking of the horn on the material handling vehicle 100. The operator indicator 520 can inform the operator that the current is over the limit in the current sensor 526. As will be discussed below, after the operator indicator 520, i.e., the horn, is indicated in step 718, the process 700 will proceed to raising the clamping bar 254 and lowering the platform 170 if the platform is not in the down position. If the current has not reached the limit at step 716, the process 700 may proceed to step 720 where the control unit 502 determines if the clamping bar 254 has reached the first state, i.e., lower limit. In other words, at step 720, the control unit 502 can be in communication with the clamping position sensor 524 to determine the position of the clamping bar 254. If the clamping bar 254 has not reached the first state, i.e., lower limit, the process 700 may continue to step 712 and continue to move the clamping bar 254 down to the first state. If the clamping bar 254 has reached the first state, i.e., lower limit has been reached, the process 700 can continue to step 722.

In step 722, the process 700 includes lifting the platform 170 (via the forks 150) from the down position to the up position. As the platform 170 rises, the process 700 may continue to step 724 where the control unit 502 again monitors if the operator is still on the mat 142 in the operator compartment 112. As discussed above, the operator sensor 522 can communicate with the control unit 502 to determine if the operator is still on the mat 142. If the operator is not on the mat 142 in step 724, the process 700 can move back to the top of FIG. 14A and the platform 170 can stop rising. In some non-limiting examples, at step 724, if the operator is not on the mat 142, the platform 170 and/or the clamping bar 254 may stop at their current position until the operator steps back onto the mat 142. In some non-limiting examples, at step 724, if the operator is not on the mat 142, the platform 170 may move back to the down position and the clamping bar 254 may move up to the second or third state. Therefore, as noted herein, the operator may need to be on the mat 142 while the clamping bar 254 and the platform 170 move. If the operator ever gets off the mat 142 during any of these steps, i.e., steps 710, 712, 714, 716, 720, 722, 724, and 726, the control unit 502 can stop the lifting/lowering of the clamping bar 254 and the platform 170.

If the operator is still on the mat 142 at step 724, the process 700 may proceed to step 726 and determine if the platform 170 has reached the up position, i.e., lift limit. If the platform 170 has not reached the up position, i.e., lift limit, the process 700 can proceed to step 722 to further lift the platform 170. In some non-limiting examples, the lifting sensor 516 can be used to determine if the platform 170 has reached the up position. As illustrated in FIGS. 14A and 14B, once the platform 170 reaches the up position, the process 700 can proceed back to the top of the flowchart in FIG. 14A. In particular, the material handling vehicle 100 can move once the platform 170 is in the up position.

After the material handling vehicle 100 is loaded with the plurality of carts 400, the material handling vehicle 100 may move around the warehouse filling the carts 400, for example, until it has reached its unloading zone. While the material handling vehicle 100 continues to perform its tasks, the process 700 can continuously monitor, at step 730, to see if the lower forks button has been pressed. As noted herein, the lower forks button may engage the unloading step. If the lower forks button has been pressed, the process 700 can proceed to step 732 to determine if the platform 170 or the clamping bar 254 are currently being moved. If the platform 170 or the clamping bar 254 are being moved, the process 700 returns to the top of the flowchart until a specific situation is activated. If, at step 732, it is determined that the platform 170 and the clamping bar 254 are not moving, the process 700 can simultaneously proceed to step 734 and step 736. As noted herein, after step 718, the process can also proceed to steps 734 and steps 736 once the horn, i.e., operator indicator 520, has been sounded.

At step 734, the control unit 502 can start a timer t1 and then proceed to step 738 to lower the platform 170 (via the forks 150). As the platform 170 is being lowered, the process 700 can proceed to step 740 were the control unit 502 determines if a certain time period, e.g., 5 seconds, has passed since the timer t1 has started. Step 740 allows enough time for the platform 170 to completely lower from the up position to the down position. In some non-liming examples, it may take 1, 2, 3, 4, 5, or 6 seconds for the platform 170 to lower to the down position. If the timer t1 has reached 5 seconds, the process 700 can proceed to the top of the flowchart in FIG. 14A. At step 740, if the time period has not passed, the process 700 continues to step 742 where the control unit 502 via the operator sensor 522 determines if the operator has stepped onto the mat 142. If the operator has not stepped on the mat 142 at step 742, the process 700 continues to lower the platform 170 at step 738.

However, if the operator has stepped on to the mat 142 in step 742, the process 700 continues to the top of the flowchart in FIG. 14A. Put differently, step 742 is determining if the operator has stepped onto the mat 142 within the operator compartment 112. As noted herein, step 742 requires the operator to step off of the mat 142 and then step back to the mat 142 to trigger the "Yes" condition in step 742. The operator can stand on the mat 142 before and while the clamping bar 254 rises and the platform 170 lowers. However, if the operator steps off the mat 142, after pressing the lower forks button, and then steps on the mat 142 at step 742, the "Yes" condition in step 742 may be activated. In some non-limiting examples, if the operator steps onto the mat 142 (after having stepped off) while the platform 170 lowers and the clamping bar 254 moves to the second state, the material handling vehicle 100 will change the operation being performed and raise the platform 170 and move the clamping bar 254 back to the first state.

At step 736, the process 700 includes releasing the clamping bar 254. In other words, at step 736, the process 700 includes moving the clamping bar 254 from the first state to the second state to unclamp the plurality of carts 400. As discussed above, the clamping bar 254 is configured to move while the platform 170 moves in the unloading step. However, in some non-limiting examples, the platform 170 may be lowered to the down position before the clamping bar 254 moves from the first state to the second state.

While the clamping bar 254 is moved to the second state in step 736, the process 700 can proceed to step 744 to determine if the operator is on the mat 142 in the operator compartment 112. As discussed above with respect to step 742, step 744 requires the operator to first step off the mat 142 and then step back onto the mat to initiate the "Yes" condition in step 744 and return the process 700 to the top of the flow chart in FIG. 14A. If the operator has not stepped onto the mat 142, the process 700 will continue to step 746 and determine if the current has exceeded the current limit on the current sensor 526. As discussed above, the current sensor 526 can be in communication with the control unit 502 to determine if there is a greater than normal force required to move the platform 170 and/or the clamping bar 254. If the current in step 746 is greater than the current limit, the process 700 will stop movement of the platform 170 and/or the clamping bar 254 and proceed to the top of the flowchart in FIG. 14A. If the current in step 746 is not greater than the current limit, the process 700 will proceed to step 748. In some non-limiting examples, if the current hits the current limit, the clamping bar 254 may move back down to the first state.

In step 748, the current sensor 526 can determine if the current from the actuators 274 is zero. As noted herein, once the actuators 274 have moved the clamping bar 254 to the second state, an internal limit switch in each of the actuators 274 can disconnect the actuators 274 from the circuit and allow there to be no current drawn by the actuators 274. Therefore, if there is still a current at step 748, then the clamping bar 254 has not yet reached the second state. As such, if the current in step 748 is not zero, the process 700 can proceed to step 736 to further raise the clamping bar 254 to the second state. If the current is at zero in step 748, the process 700 can proceed to step 750 to lower the clamping bar 254 to the third state.

As discussed above, in some non-limiting examples, it is advantageous to lower the clamping bar 254 to a position below the second state and above the first state in order to reduce the amount of time necessary to lower the clamping bar 254 again once new carts 400 are inserted. Therefore, in some non-limiting examples, the clamping bar 254 can move to the third state in step 750 that is positioned between the first state and the second state. As discussed above, in the third state, the clamping bar 254 would lower to a position that is just above the uppermost portion 406 on the plurality of carts 400. Therefore, in the third state, the operator can still move the plurality of carts 400 on and off the platform 170, i.e., the plurality of clamps 302 will not limit the movement of the plurality of carts 400. As noted herein, step 752 assists in identifying when the clamping bar 254 has reached the third state. If the clamping bar 254 has not reached the third state, the process 700 can continue to step 750 until the clamping position sensor 524 has determined that the clamping bar 254 has reached the third state, i.e., the upper limit detected. After the clamping bar 254 has reached the third state, the process 700 can proceed to the beginning, i.e., the top of the flow chart. As further noted herein, the top of the flow chart refers to a state in which the process is waiting for a condition from step 704, step 710, or step 730 to begin. Therefore, the control unit 502 can be constantly monitoring for step 704, step 710, or step 730 to begin, i.e., initiate. In some non-limiting examples, the material handling vehicle 100 can move around while the process is waiting for one of the conditions from steps 704, 710, or 730 to begin. As further noted herein, the entire process 700 can stop or end if the key is removed from the material handling vehicle 100.

The present disclosure provides distinct advantages, such as advantageously assisting the operator during the unloading and loading stages. In particular, the material handling vehicle 100 can automatically start lowering the clamping bar 254 and raising the platform 170 once the operator steps onto the mat 142 of the operator compartment 112. Additionally, the material handling vehicle 100 can quickly lower the platform 170 and raise the clamping bar 254 once the operator has engaged the unloading step, e.g., pressed the lower forks button. Therefore, the present disclosure provides systems and methods for minimizing the steps needed for the operator to load and unload the material handling vehicle 100.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A method for loading a material handling vehicle, the method comprising:

providing the material handling vehicle, the material handling vehicle comprising a platform and a post assembly attached with a clamping assembly, the clamping assembly comprising a clamping bar and two spaced apart actuators, the clamping bar is configured to move relative to the post assembly between a first state and a second state;

loading a plurality of carts on the platform of the material handling vehicle;

determining an end of the loading step;

moving the clamping bar from the second state to the first state after the end of the loading step has been determined; and moving the platform from a down position to an up position after the clamping bar has moved from the second state to the first state.

2. The method of claim 1, wherein the material handling vehicle further comprises an operator compartment, and wherein the operator compartment defines a floor having a mat.

3. The method of claim 2, wherein the end of the loading step is determined when an operator steps on the mat.

4. The method of claim 1, wherein four carts are loaded onto the platform of the material handling vehicle.

5. The method of claim 1, wherein the clamping bar is configured to move from the second state to the first state by the two spaced apart actuators.

6. The method of claim 1, wherein the method further comprises moving the material handling vehicle and filling the plurality of carts.

7. The method of claim 1, wherein the clamping bar is configured to move independently from the platform.

8. A method for loading and unloading a material handling vehicle, the method comprising:

providing the material handling vehicle, the material handling vehicle comprising a control unit, a platform, and a post assembly attached with a clamping assembly, the clamping assembly comprising a clamping bar that is configured to move relative to the post assembly between a first state and a second state;

loading a plurality of carts on the platform of the material handling vehicle;

determining an end of the loading step;

moving the clamping bar from the second state to the first state after the end of the loading step has been determined;

moving the platform from a down position to an up position after the clamping bar has moved from the second state to the first state;

moving the material handling vehicle;

engaging an unloading step;

simultaneously moving the platform from the up position to the down position and moving the clamping bar from the first state to the second state after the unloading step has been engaged; and unloading the plurality of carts from the platform of the material handling vehicle.

9. The method of claim 8, wherein the platform comprises a platform length PL and the clamping bar comprises a clamping bar length CL, and wherein the clamping bar length CL is less than 90 percent of the platform length PL.

10. The method of claim 8, wherein two actuator assemblies on opposite sides of the clamping assembly move the clamping bar from the second state to the first state and from the first state to the second state.

11. The method of claim 8, wherein the material handling vehicle further comprises an operator compartment, wherein the operator compartment defines a floor having a mat, and wherein the end of the loading step is determined when an operator steps on the mat.

12. The method of claim 8, wherein a single button engages the unloading step.

* * * * *